(12) United States Patent
Nakamura et al.

(10) Patent No.: US 7,623,177 B2
(45) Date of Patent: Nov. 24, 2009

(54) IMAGE CAPTURING DEVICE HAVING MULTIPLE OPTICAL SYSTEMS

(75) Inventors: Hideo Nakamura, Nagano (JP); Gakuji Horigome, Nagano (JP); Masao Kobayashi, Nagano (JP); Kazuyasu Kurata, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 591 days.

(21) Appl. No.: 11/311,466

(22) Filed: Dec. 19, 2005

(65) Prior Publication Data

US 2007/0024737 A1    Feb. 1, 2007

(30) Foreign Application Priority Data

Aug. 1, 2005    (JP) .............................. 2005-223463

(51) Int. Cl.
    *H04N 5/225*    (2006.01)
(52) U.S. Cl. ................... 348/344; 348/208.11; 348/335; 348/372; 348/222.1; 359/676
(58) Field of Classification Search ................. 348/344, 348/208.11, 335, 372, 222.1; 359/676
    See application file for complete search history.

(56) References Cited

U.S. PATENT DOCUMENTS

| | | | | |
|---|---|---|---|---|
| 4,772,903 A | * | 9/1988 | Labaziewicz | ................. 396/84 |
| 5,051,830 A | * | 9/1991 | von Hoessle | ................. 348/335 |
| 5,566,006 A | * | 10/1996 | Yoshinaga et al. | .......... 358/475 |
| 6,252,536 B1 | * | 6/2001 | Johnson et al. | .............. 341/155 |
| 7,012,635 B2 | * | 3/2006 | Umeda et al. | ............. 348/208.4 |
| 7,221,399 B2 | * | 5/2007 | Fujita et al. | .................. 348/340 |
| 2003/0020814 A1 | * | 1/2003 | Ono | ......................... 348/220.1 |
| 2004/0233324 A1 | * | 11/2004 | Galambos et al. | ........... 348/372 |
| 2006/0044408 A1 | * | 3/2006 | Nishizawa | ................ 348/222.1 |

FOREIGN PATENT DOCUMENTS

| | | |
|---|---|---|
| JP | 10042183 | 2/1998 |
| JP | 2003283910 | 10/2003 |

* cited by examiner

*Primary Examiner*—David L Ometz
*Assistant Examiner*—Quang V Le
(74) *Attorney, Agent, or Firm*—Pamela R. Crocker; Peyton C. Watkins

(57) ABSTRACT

In a digital camera having multiple optical systems, multiple image capturing elements are effectively driven to reduce power consumption. A digital camera has a first image capturing optical system having a lens and a first image sensor and a second image capturing optical system having a lens and a second image sensor. A controller and timing generator selects the image signal from the first image capturing optical system while controlling an operation or power of the second image sensor and a clock driver to be OFF when the zoom position falls within a first zoom range. When the zoom position falls within a second zoom range, the image signal from the second image capturing optical system is selected while an operation or power of the first image sensor and a clock driver is controlled to be OFF. An operation or power of the image capturing optical system which is not selected is stopped so that power consumption is reduced.

8 Claims, 20 Drawing Sheets

IMAGE CAPTURING DEVICE HAVING MULTIPLE OPTICAL SYSTEMS

FIELD OF THE INVENTION

The present invention relates to an image capturing device such as a digital camera and, more particularly, to an image capturing device having multiple optical systems for capturing an image of a scene.

BACKGROUND OF THE INVENTION

Currently, many digital cameras have a zoom lens and a single image sensor to capture still and motion images. The captured images are then digitally processed to produce digital image files, which are stored in a memory in the digital camera. The digital image files can then be transferred to a computer and displayed, or transferred to a printer and printed.

Small camera size and a large optical zoom range are very important features of digital cameras. Users prefer to have a large zoom range rather than a limited zoom range. Unfortunately, providing a large zoom range lens, without sacrificing the quality of the captured images, increases the size of the digital camera. With higher-cost cameras, such as single lens reflex cameras, these problems are sometimes addressed by using multiple, interchangeable zoom lenses, such as a 28-70 mm zoom and a 70-210 mm zoom. Such an option, however, is inconvenient for a user of a compact digital camera.

Some digital cameras use one lens and multiple image sensors to produce a color image. Light from a target is separated into multiple colors by a prism beam splitter, and multiple monochrome image sensors are used to capture red, green, and blue color images.

Stereo film cameras and stereo digital cameras are known in the related art. These cameras have two horizontally separated lenses of identical focal length, which form slightly different images of the scene onto two frames of film or two image sensors. The two images provide a so-called "stereo pair." The two lenses are designed to provide the same magnification, and both are used to simultaneously capture the left and right eye images on the image sensors in order to achieve a stereo effect.

In a compact digital camera, in order to obtain a large zoom range without incurring the cost of lens exchange, the digital camera is preferably equipped with multiple lenses having different focal lengths and the multiple lenses are used distinctively in accordance with a zoom position. When, for example, two lenses having different focal lengths are equipped on a camera, important factors include how the focal lengths are set and how the two lenses are switched, because a digital camera has, in addition to the optical zoom function, an electronic zoom function for electronically zooming digital image data.

Japanese Patent Laid-Open Publication No. Hei 10-42183 discloses a camera having one lens and one image sensor in which an angle of view is determined by driving an electronic zoom and an optical zoom, and a percentage of the optical zoom is increased while the angle of view is maintained.

Japanese Patent Laid-Open Publication No. 2003-283910 discloses a camera having an optical finder and a zoom finder wherein the finders are suitably switched and, when the finder is switched from the electronic finder to the optical finder, the lens of the optical finder system is driven in connection with the image capturing lens so that the angles of view match each other.

The above-described related art references relate to a camera having one lens and one image sensor and do not relate to a camera system having multiple optical systems for capturing images of a scene. Thus, none of these references discloses how the optical system is switched among the multiple optical systems.

Assume a digital camera having two lenses including a fixed focal length lens and a zoom lens. The switching of these two lenses is performed as follows. A focal length gap between the focal length of the fixed focal length lens and a minimum focal length of the zoom lens is interpolated by an electronic zoom of a digital image obtained by the fixed focal length lens. The camera is provided with a zoom-setting unit (zoom button) for setting a zoom position, and the user can set the zoom-setting unit to the wide side (wider angle) or to the tele side (narrower angle) so that the user can capture images at a desired zoom position. When the user sets the zoom setting unit provided on the camera to "tele," the digital image obtained by the fixed focal length lens is electronically zoomed in, the lens is switched to the zoom lens when a tele-end of the electric zoom is reached, and the optical zoom is performed by use of the zoom lens. When, on the other hand, the user operates the zoom-setting unit to set the zoom-setting unit to "wide," a digital image obtained by the zoom lens is optically zoomed out, the lens is switched to the electronic zoom of the fixed focal length lens when the minimum focal length of the zoom lens is reached, and the camera is zoomed out by use of the fixed focal length lens.

In a digital camera having two lenses, image capturing elements such as a CCD and CMOS are provided in correspondence to each lens. However, a structure for driving the image capturing elements using drivers provided in correspondence to the image capturing elements requires high power, and, therefore, may shorten a drive time of the digital camera using a battery. Thus, in a digital camera having multiple optical systems, an important factor for the user's convenience is to effectively drive the multiple image capturing elements.

SUMMARY OF THE INVENTION

The present invention advantageously provides an image capturing device having multiple optical systems in which multiple image capturing elements are effectively driven so as to reduce power consumption.

According to one aspect of the present invention, there is provided an image capturing device comprising a first image capturing optical system which has a first lens and a first image capturing element with a relatively wide angle of view and which has a variable angle of view; a second image capturing optical system which has a second lens and a second image capturing element with a relatively narrow angle of view and which has a variable angle of view; a user operating unit which sets a zoom position; and a control unit which outputs one of an image signal from the first image capturing optical system and an image signal from the second image capturing optical system in accordance with the zoom position which is set by the user operating unit, the control unit performing control to output the image signal from the first image capturing optical system while controlling the second image capturing element to a non-operational state when the zoom position falls within a first zoom range which is at a wider angle than is a predetermined first threshold zoom position, and the control unit performing control to output the image signal from the second image capturing optical system while controlling the first image capturing element to a non-operational state when the zoom position falls within a second zoom range which is positioned nearer to a tele side than is the first threshold zoom position.

According to another aspect of the present invention, there is provided an image capturing device comprising a first image capturing optical system which has a first lens and a first image capturing element with a relatively wide angle of view and which has a variable angle of view; a second image capturing optical system which has a second lens and a second image capturing element with a relatively narrow angle of view and which has a variable angle of view; a user operating unit which sets a zoom position; and a control unit which outputs one of an image signal from the first image capturing optical system and an image signal from the second image capturing optical system in accordance with the zoom position which is set by the user operating unit, the control unit performing control to output the image signal from the first image capturing optical system while controlling the second image capturing element to a non-operational state when the zoom position falls within a first zoom range which is at a wider angle than is a predetermined first threshold zoom position and is at a wider angle than is a second threshold zoom position which is at a wider angle than is the first threshold zoom position, and the control unit performing control to output the image signal from the second image capturing optical system while controlling the first image capturing element to a non-operational state when the zoom position falls within a second zoom range which is positioned nearer to a tele side than is the first threshold zoom position.

In the present invention, the "non-operational state" includes a state in which the element is not operating even though the power is being supplied and a state in which the supply of the power itself is stopped.

According to the present invention, in an image capturing device having multiple image capturing optical systems in which an image signal from one of the optical systems is selectively output, the image capturing element that is not selected is set to a non-operational state so that power consumption is reduced.

BRIEF DESCRIPTION OF THE DRAWINGS

A preferred embodiment of the present invention will be described in detail by reference to the drawings, wherein.

DETAILED DESCRIPTION OF THE INVENTION

Figure 1:
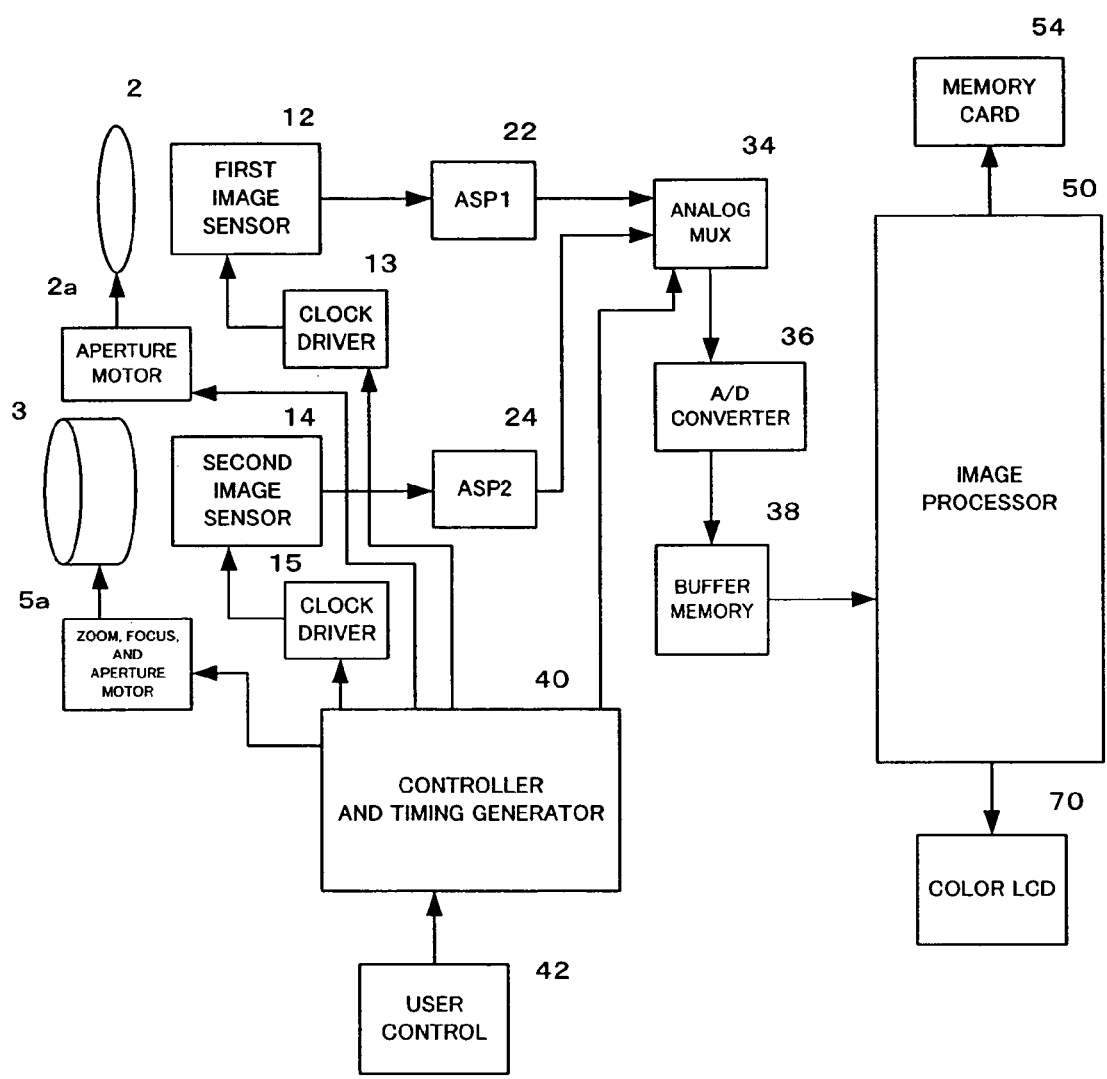
FIG. 1 is a diagram showing a basic structure of a digital camera.

A preferred embodiment of the present invention will now be described referring to the drawings.

FIG. 1 is a block diagram showing a basic structure of a digital camera according to a preferred embodiment of the present invention. The digital camera is a portable camera which is driven by a battery. The digital camera produces a still digital image which is stored in a removable memory card 54. The digital camera may produce a motion digital image in addition to or in place of the still image. The motion digital image is similarly stored in the memory card 54.

The digital camera comprises an image capturing assembly which includes a fixed focal length lens 2 which forms an image of a scene on a first image sensor 12 and a zoom lens 3 which forms an image of the scene on a second image sensor 14. The image capturing assembly provides a first image output from the first image sensor 12 and a second image output from the second image sensor 14. The image sensors 12 and 14 are image sensors having the same aspect ratio and the same pixel size. The lens 2 is an ultra-wide angle lens with a 35 mm film equivalent focal length of 22 mm, and the zoom lens 3 is a zoom lens with a 35 mm film equivalent focal length of 40 mm-120 mm.

The focal length of the fixed lens 2 provides an ultra-wide field of view and focuses on targets from 4 feet to infinity. Therefore, the fixed lens 2 does not need focus adjustment. The fixed focal length lens 2 has a diaphragm and a shutter assembly for controlling exposure of the image sensor 12. The zoom lens 3 is driven by a zoom and focus motor 5a and comprises a diaphragm and a shutter assembly for controlling exposure of the image sensor 14.

The image sensors 12 and 14 are single-chip color mega pixel CCD sensors and use well-known Bayer color filters for capturing color images. The image sensors 12 and 14 have a 4:3 image aspect ratio, 3.1 effective mega pixels, and 2048 pixels×1536 pixels.

A controller and timing generator 40 controls the first image sensor 12 by supplying a signal to a clock driver 13 and controls the second image sensor 14 by supplying a signal to a clock driver 15. The controller and timing generator 40 also controls the zoom and focus motor 5a and a flash for irradiating a scene. A user control 42 is used for controlling operations of the digital camera.

An analog output signal from the first image sensor 12 is amplified by a first analog signal processor (ASP1) 22 which also performs a process such as correlated double sampling, and is supplied to a first input of an analog multiplexer 34 (analog MUX). A second analog output signal from the second image sensor 14 is amplified by a second analog signal processor (ASP2) 24 which also performs a process such as correlated double sampling, and is supplied to a second input of the analog MUX 34. A function of the analog MUX 34 is to select one of the first sensor output from the first image sensor 12 and the second sensor output from the second image sensor 14 and to supply the selected sensor output from the image capturing assembly to subsequent components.

The controller and timing generator 40 controls the analog MUX 34 in order to supply an output of the first analog signal processor (ASP1) 22 or an output of the second analog signal processor (ASP2) 24 to an analog-to-digital (A/D) converter circuit 36. The digital data supplied from the A/D converter 36 is stored in a DRAM buffer memory 38 and is processed by an image processor 50. The process executed by the image processor 50 is controlled by firmware stored in a firmware memory comprising a flash EPROM memory.

Alternatively, there may be employed a configuration in which two A/D converter circuits are respectively connected to the outputs of the first analog signal processor (ASP1) 22 and the second analog signal processor (ASP2) 24. In this case, the analog MUX 34 is not necessary and a digital multiplexer is used to select one of the outputs of the A/D converter circuits.

The digital image file processed by the image processor 50 is stored in the removable memory card 54. The memory card 54 is one type of a digital image storage medium and may be used in a number of different physical formats. For example, the memory card 54 may be applied to a known format such as Compact Flash (registered trademark), smart media, memory stick, MMC, SD, or XD memory card. Other formats such as, for example, a magnetic hard drive, a magnetic tape, or an optical disk may be used. Alternatively, the digital camera may use an internal non-volatile memory such as a flash EPROM. In such a case, the memory card 54 is not necessary.

The image processor 50 executes various housekeeping and image processing functions including color interpolation by color and tone correction for producing sRGB image data. The sRGB image data are then compressed in JPEG format and are stored in the memory card 54 as JPEG image data. The sRGB image data may also be supplied to a host PC via a host interface such as SCSI connection, USB connection, or FireWire connection. The JPEG file uses the so-called "Exif" image format.

The image processor 50 is typically a programmable image processor and may be a hardwired customized integrated circuit processor, a general-purpose microprocessor, or a combination of the hardwired customized IC processor and the programmable processor.

The image processor 50 also produces a low-resolution thumbnail image. After an image is captured, the thumbnail image is displayed on a color LCD 70. The graphical user interface displayed on the color LCD 70 is controlled by the user control 42.

The image capturing assembly may be an integrated assembly including the lenses 2 and 3, the image sensors 12 and 14, an aperture motor 2a, and the zoom and focus motor 5a. In addition, the integrated assembly may include the clock drivers 13 and 15, the analog signal processors 22 and 24, the analog MUX 34, and the A/D converter 36.

Figure 2:
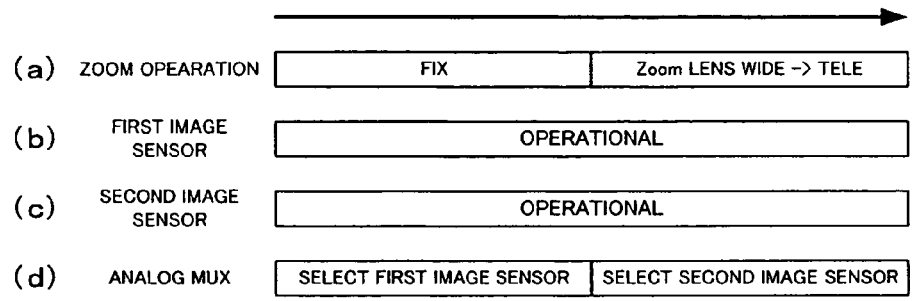
FIG. 2 is a chart showing a switching diagram of the digital camera shown in FIG. 1.

FIG. 2 shows switching timings of the zoom operations of the lenses 2 and 3, first image sensor 12, second image sensor 14, and analog MUX 34. In FIG. 2, the zoom position transitions from wide to tele from the left side of the figure toward the right side of the figure. At the wide side, an electronic zoom of the fixed focal length lens 2 (FIX) is in operation and the zoom is switched from the electronic zoom of the fixed focal length lens 2 to an optical zoom of the zoom lens 3 (Zoom LENS) at a certain zoom position (first threshold zoom position) (WIDE to TELE). The zoom may be further switched to the electronic zoom of the zoom lens 3 when the optical zoom of the zoom lens 3 is transitioned to a certain zoom position. The first image sensor 12 and the second image sensor 14 are in a power ON state so long as the power of the digital camera is ON and is in an operational state. In other words, when the zoom position which is set by the zoom button of the user control 42 falls within an electronic zoom range of the fixed focal length lens 2, the first image sensor 12 is operational and, at the same time, the second image sensor 14 is also operational. When the zoom position falls within the electronic zoom range of the fixed focal length lens 2, an image signal from the first image sensor 12 is selected and output by the MUX 34. When the zoom position falls within the optical zoom range or the electronic zoom range of the zoom lens 3, an image signal from the second image sensor 14 is selected and output by the MUX 34. Even when the image signal from the second image sensor 14 is being selected and output, the first image sensor 12 continues to be operational. The switching diagram of FIG. 2 shows the most basic switching operation, but the power consumption is high because the first image sensor 12 and the second image sensor 14 are always in a power ON state.

Figure 3:
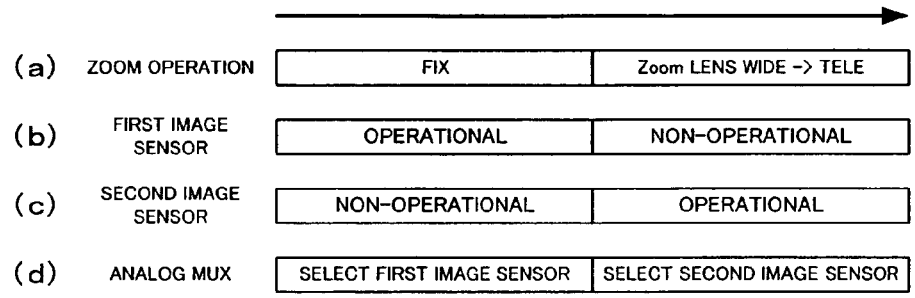
FIG. 3 is a chart showing another switching diagram of the digital camera shown in FIG. 1.

FIG. 3 shows another switching operation diagram of the structure shown in FIG. 1. When the zoom position falls within the optical zoom range or the electronic zoom range of the fixed focal length lens 2, the first image sensor 12 is operational, but the second image sensor 14 is in a non-operational state. When the zoom position falls within the electronic zoom range of the zoom lens 3, the second image sensor 14 is operational, but the first image sensor 12 is in a non-operational state. In other words, the operation of the image sensor corresponding to the lens which is not being used is stopped on the basis of the zoom position, in order to reduce the power consumption.

Figure 4:
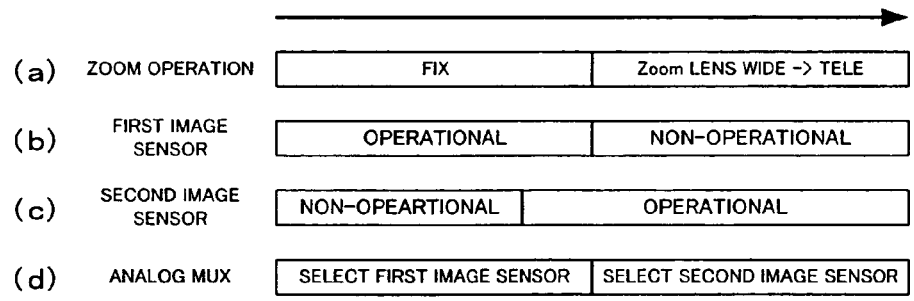
FIG. 4 is a chart showing yet another switching diagram of the digital camera shown in FIG. 1.

FIG. 4 shows yet another switching operation diagram of the structure shown in FIG. 1. When the zoom position falls within the optical zoom range or the electronic zoom range of the fixed focal length lens 2, the first image sensor 12 is operational, but the second image sensor 14 is in a non-operational state. However, unlike the configuration of FIG. 3, in the configuration of FIG. 4, the second image sensor 14 transitions from the non-operational state to the operational state at a zoom position (second threshold zoom position) before the timing of the switching from the electronic zoom of the fixed focal length lens 2 to the optical zoom of the zoom lens 3. The first image sensor 12 transitions from the operational state to the non-operational state at a timing of switching from the electronic zoom of the fixed focal length lens 2 to the optical zoom of the zoom lens 3. In this configuration also, because the image sensor corresponding to the lens which is not being used becomes non-operational, power consumption can be reduced. In addition, in this configuration, because the second image sensor 14 is transitioned to the operational state prior to (immediately before) the switching from the electronic zoom of the fixed focal length lens 2 to the optical zoom of the zoom lens 3, a delay period required for switching from the electronic zoom of the fixed focal length lens 2 to the optical zoom of the zoom lens 3 can be removed or inhibited. This process can be described as the switching of the image signal and the switching of the state of the first image sensor 12 from the operational state to the non-operational state being executed at the first threshold zoom position and the switching of the state of the second image sensor 14 from the non-operational state to the operational state being executed at a second threshold zoom position, which is at a position nearer to the wide side than is the first zoom position.

FIG. 4 shows a case in which the user operates the zoom button of the user control 42 in the tele side to transition the angle of view from the wide side to the tele side. When, on the other hand, the user sets the zoom button to the wide side to transition the angle of view from the tele side to the wide side the second image sensor 14 is operational and the first image sensor 12 is non-operational when the zoom position falls within the optical zoom range of the zoom lens 3. The first image sensor 12 is transitioned from the non-operational state to the operational state not at the first threshold zoom position, but prior to the first threshold zoom position; that is, at a third threshold zoom position which is at a position nearer to the tele side than is the first threshold zoom position so that the first image sensor 12 transitions from the non-operational state to the operational state in advance.

Figure 5:
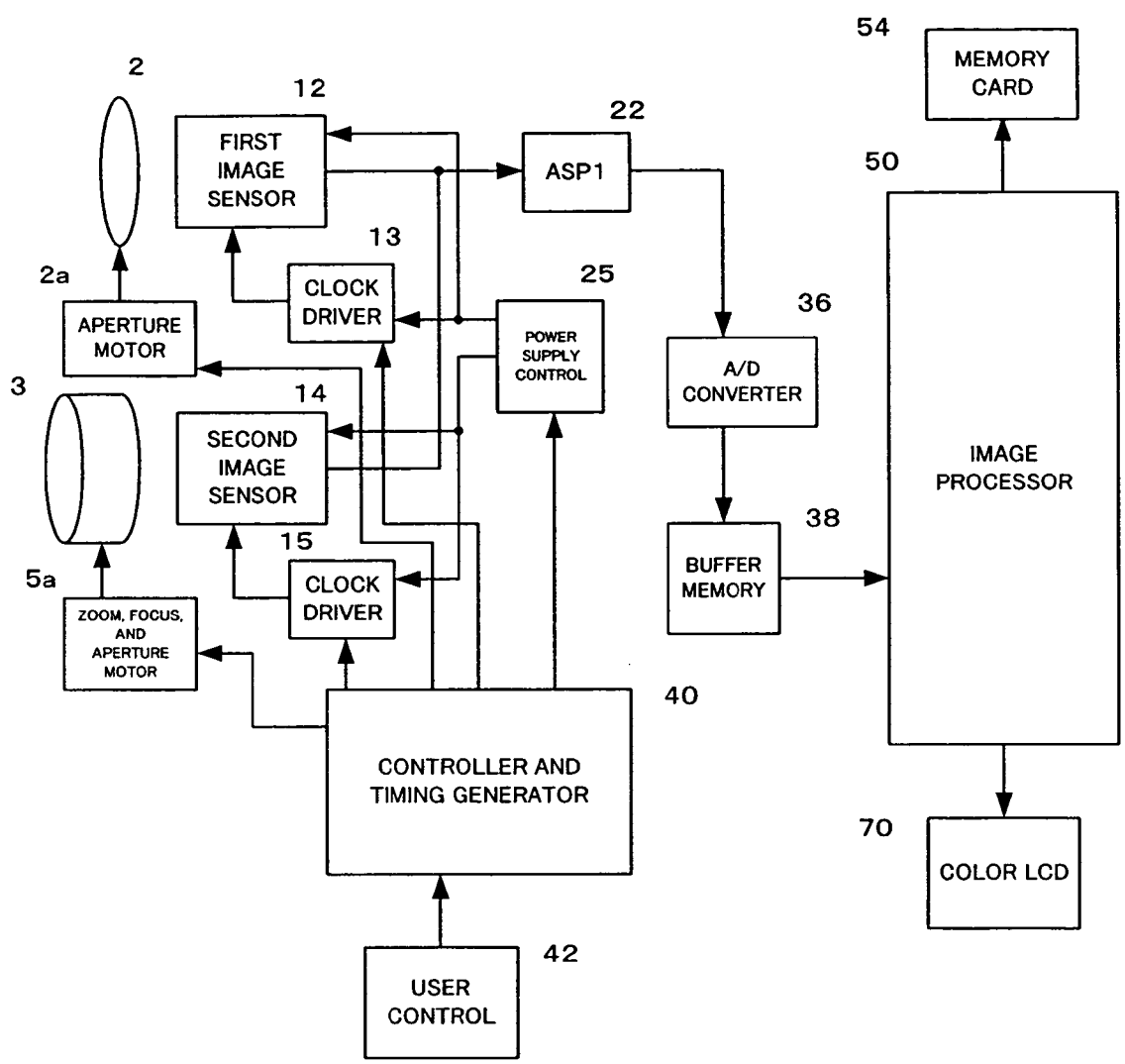
FIG. 5 is a diagram showing another basic structure of a digital camera.

FIG. 5 is a block diagram showing another structure of a digital camera. Differences from the configuration of FIG. 1 lie in that a power supply control 25 is provided to control the power supply of the first image sensor 12 and the clock driver 13 and the power supply of the second image sensor 14 and the clock driver 15 in accordance with an instruction from the controller and timing generator 40, and in that a single ASP 22 is provided by combining the analog signal processors (ASP). An image signal from the first image sensor 12 and an image signal from the second image sensor 14 are both supplied to the analog signal processor ASP 22, which amplifies the signal while executing a process such as correlated double sampling. Because a common analog signal processor ASP 22 is provided, no MUX 34 for selecting one of two signals is necessary. The image signal amplified by the analog signal processor ASP 22 is supplied to an A/D converter 36 and is converted to a digital image signal.

Figure 6:
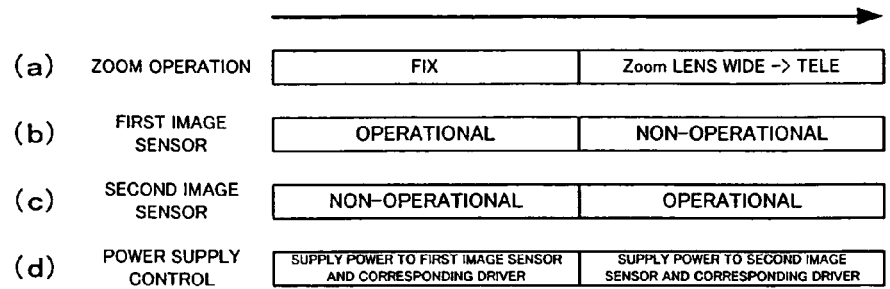
FIG. 6 is a chart showing a switching diagram of the digital camera shown in FIG. 5.

FIG. 6 shows switching of the lenses 2 and 3, the first image sensor 12, the second image sensor 14, and the power supply control 25 in the structure of FIG. 5. When the zoom position falls within the electronic zoom range of the fixed focal length lens 2, the first image sensor 12 and the clock driver 13 are supplied with power from the power supply control 25 and are operational, but the second image sensor 14 and the clock driver 15 are not supplied with power from the power supply control 25 and are non-operational. When the zoom position falls within the optical zoom range or the electronic zoom range of the zoom lens 3, the second image sensor 14 and the clock driver 15 are supplied with power and are operational, whereas the first image sensor 12 and the clock driver 13 are not supplied with power and are non-operational. By stopping supply of power to the image sensor and the clock driver corresponding to the lens which is not being used, power consumption can be further reduced.

Figure 7:
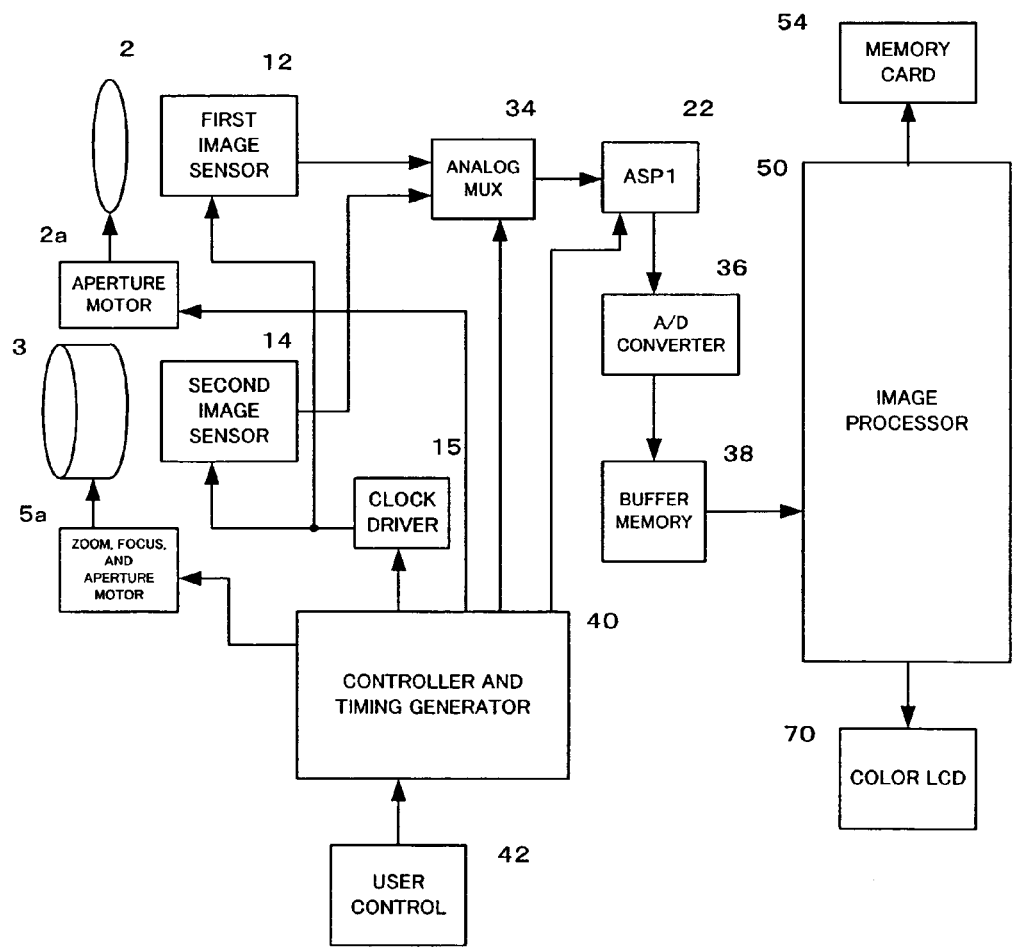
FIG. 7 is a diagram showing yet another basic structure of a digital camera.

FIG. 7 is a block diagram showing yet another structure of a digital camera. The clock drivers are combined into a common clock driver 15, and the first image sensor 12 and the second image sensor 14 are driven by solely the clock driver 15. An image signal from the first image sensor 12 and an image signal from the second image sensor 14 are supplied to the analog MUX 34, and one of the image signals is selected and supplied to the analog signal processor ASP 22. The analog signal processor ASP 22 amplifies the image signal and supplies the amplified signal to the A/D converter 36. Because two image sensors 12 and 14 are driven with solely the clock driver 15, power consumption can be reduced.

Figure 8:
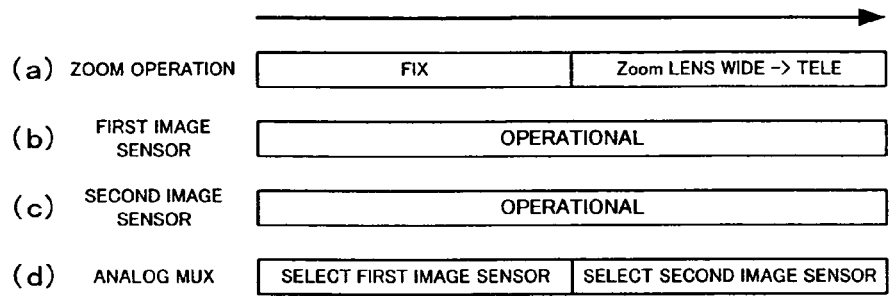
FIG. 8 is a chart showing a switching diagram of the digital camera shown in FIG. 7.

FIG. 8 shows switching of the first image sensor 12 and the second image sensor 14 in the structure shown in FIG. 7. The first image sensor 12 and the second image sensor 14 are always operational, regardless of the zoom position. When the zoom position falls within the electronic zoom range of the fixed focal length lens 2, the clock driver 15 supplies a clock signal to the first image sensor 12 and the second image sensor 14. The MUX 34 selects the image signal from the first image sensor 12. When the zoom position falls within the optical zoom range or the electronic zoom range of the zoom lens 3, the clock driver 15 supplies the clock signal to the first image sensor 12 and the second image sensor 14, and the MUX 34 selects the image signal from the second image sensor 14.

Figure 9:
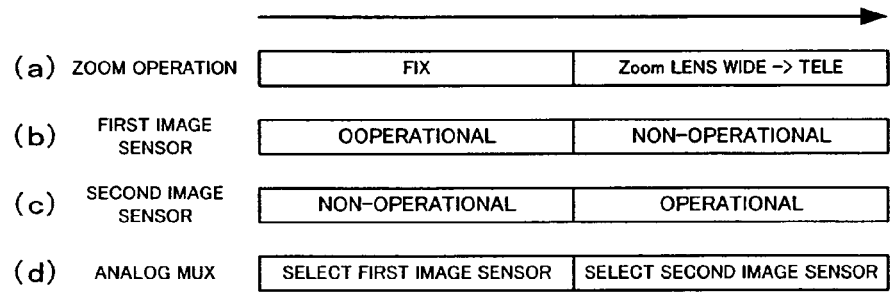
FIG. 9 is a chart showing another switching diagram of the digital camera shown in FIG. 7.

FIG. 9 shows another switching diagram of the structure shown in FIG. 7. When the zoom position falls within the electronic zoom range of the fixed focal length lens 2, the clock driver 15 supplies the clock signal only to the first image sensor 12 and supplies no clock to the second image sensor 14, so that the second image sensor 14 is non-operational. When the zoom position falls within the optical zoom range or the electronic zoom range of the zoom lens 3, the clock driver 15 supplies the clock signal only to the second image sensor 14 and supplies no clock signal to the first image sensor 12, so that the first image sensor 12 is non-operational. By not supplying the clock signal for reading to the image sensor corresponding to the lens which is not being used, power consumption can be reduced.

Figure 10:
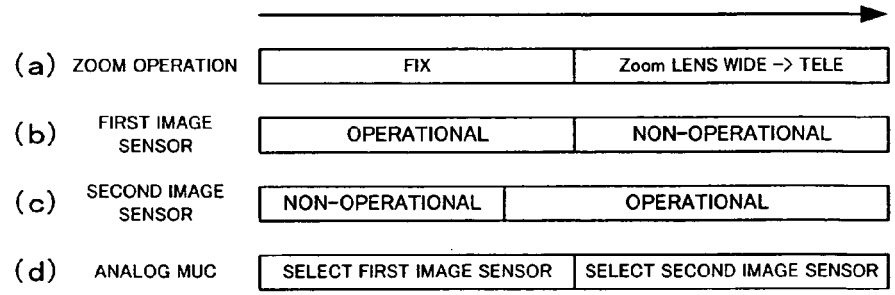
FIG. 10 is a chart showing yet another switching diagram of the digital camera shown in FIG. 7.

FIG. 10 shows another switching diagram of the structure of FIG. 7. The configuration of FIG. 10 is similar to that of FIG. 9, except that, in FIG. 10, the clock driver 15 supplies the clock signal to the second image sensor 14 immediately before the zoom is switched from the electronic zoom of the fixed focal length lens 2 to the optical zoom of the zoom lens 3, so that the second image sensor 14 is transitioned from the non-operational state to the operational state. With this structure, the delay period associated with the switching from the fixed focal length lens 2 to the zoom lens 3 can be eliminated or shortened. The first image sensor 12 is transitioned from the operational state to the non-operational state at the timing of switching from the electronic zoom of the fixed focal length lens 2 to the optical zoom of the zoom lens 3.

Figure 11:
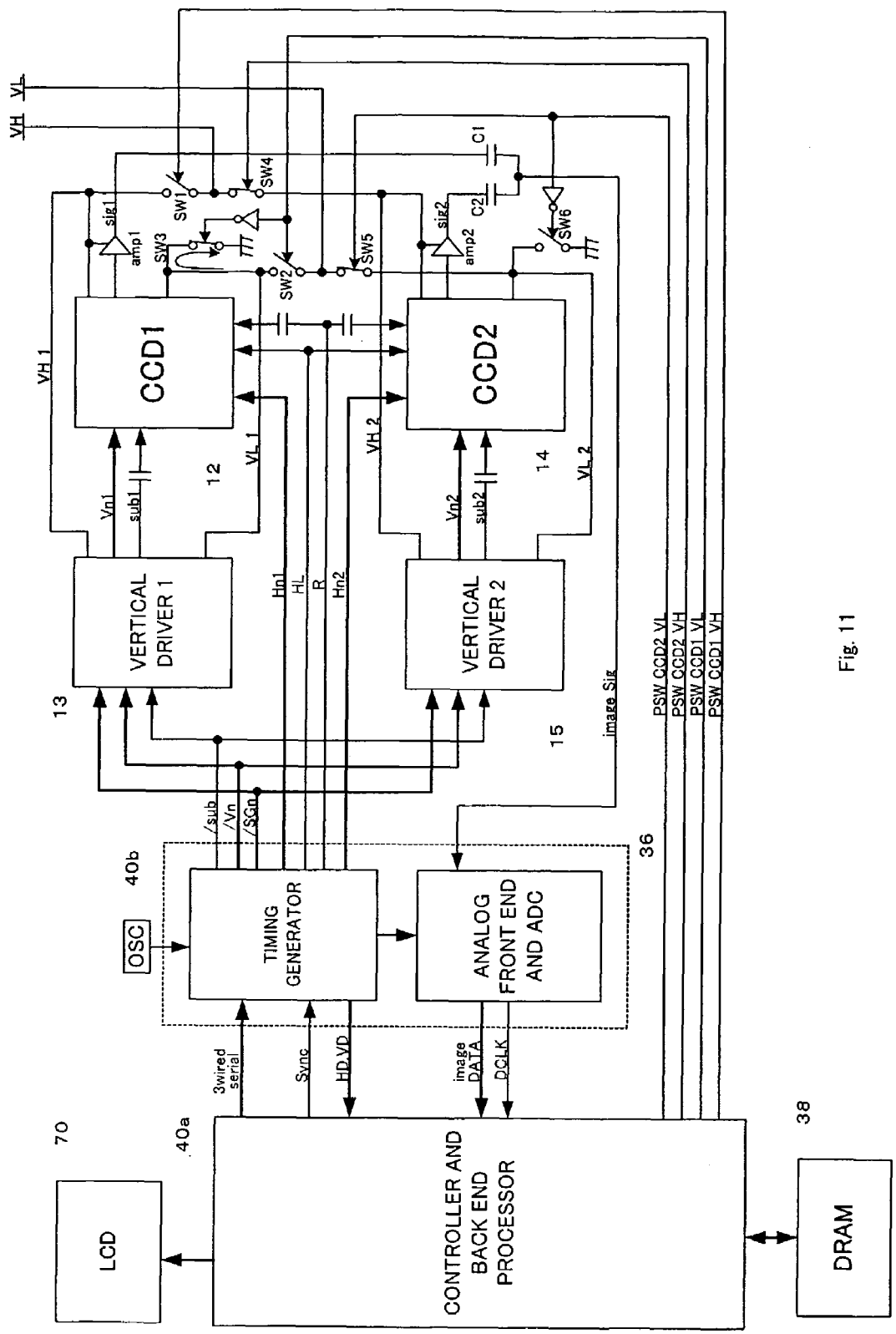
FIG. 11 is a diagram showing a detailed structure of a digital camera.

FIG. 11 shows a detailed structure of the digital camera according to the present embodiment, corresponding to the structure of FIG. 5. The controller and timing generator 40 is shown separated into a controller 40a and a timing generator 40b. The clock driver 13 is shown as a vertical driver 13, and the clock driver 15 is shown as a vertical driver 15.

The first image sensor (CCD1) 12 and the second image sensor (CCD2) 14 are driven by a horizontal transfer clock signal (horizontal transfer drive signal) Hn and a vertical transfer clock signal (vertical transfer drive signal) Vn and transfer and output accumulated charges. The horizontal transfer drive signal is supplied from the timing generator 40b to the first image sensor 12 and the second image sensor 14, and the vertical transfer drive signal is supplied from the vertical drivers 13 and 15. In other words, the timing generator 40b supplies a horizontal transfer driver signal Hn1 to the first image sensor 12 and a horizontal transfer drive signal Hn2 to the second image sensor 14. The timing generator 40b supplies a horizontal transfer path final stage drive signal HL and a reset pulse R to the first image sensor 12 and the second image sensor 14. A drive signal based on the horizontal driver and which is of low load is shared by the first image sensor 12 and the second image sensor 14. In addition, the timing generator 40b supplies the vertical transfer drive signal Vn to the vertical drivers 13 and 15. The vertical driver 13 supplies a vertical transfer drive signal Vn1 to the first image sensor 12 and the vertical driver 15 supplies a vertical transfer drive signal Vn2 to the second image sensor 14.

Figure 26:
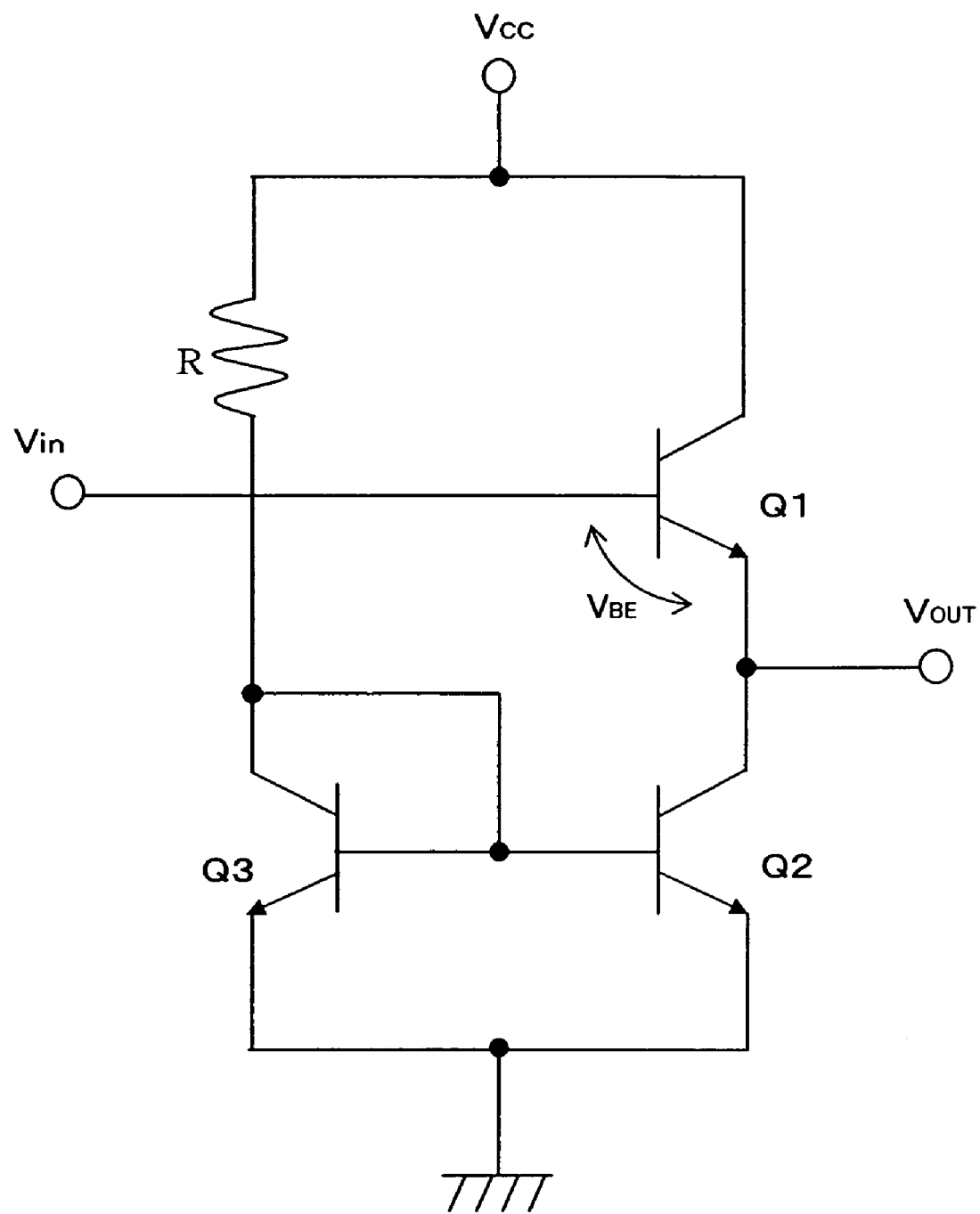
FIG. 26 is a circuit diagram of an amplifier amp1 and an amplifier amp2.

An image signal sig1 read from the first image sensor 12 is amplified by an amplifier amp1 (having a gain of 1.0; substantially functions as a buffer or an impedance converter) and is supplied to a capacitor C1. Meanwhile, an image signal sig2 read from the second image sensor 14 is amplified by an amplifier amp2 (having a gain of 1.0; substantially functions as a buffer or an impedance converter) and is supplied to a capacitor C2. The capacitor C1 and the capacitor C2 have the other electrodes connected to each other so that the first image sensor 12 and the capacitor C1 are connected in parallel with respect to the second image sensor 14 and the capacitor C2. An output of the capacitor C1 and an output from the capacitor C2 are supplied to an analog front end (AFE) and A/D converter 36 which is provided downstream of the capacitors C1 and C2. The AFE and A/D converter 36 corresponds to the ASP 22 and the A/D converter 36 shown in FIG. 5. The amplifiers amp1 and amp2 are emitter followers of bipolar transistors each having a base terminal serving as an input terminal (an image signal from the image sensor is supplied), an emitter terminal serving as an output terminal, and a collector terminal being connected to a power supply. The amplifiers amp1 and the amp2 become high impedances when the power supply on the collector is OFF. FIG. 26 shows an example structure of an emitter follower forming the amplifiers amp1 and amp2. A constant current load is formed from a bipolar transistor Q3 directly connected to a resistor R and a bipolar transistor Q2, and the constant current load is connected to a bipolar transistor Q1. A collector power supply Vcc is connected to the resistor R and the collector of the transistor. When a signal is applied to an input terminal Vin, a signal having a voltage which is lower than the voltage Vcc by a base-emitter voltage $V_{BE}$ of the transistor Q1 is output on an output terminal Vout. During operation, this structure operates as an amplifier with a voltage gain of 1. Meanwhile, when the collector power supply Vcc is switched OFF the transistor Q2 is switched OFF and the output impedance of the output terminal Vout approaches infinity. In this description, the amplifier is formed as an emitter follower from bipolar transistors, but the present invention is not limited to such a configuration, and similar advantages can be obtained by forming the amplifier as a source follower from an FET. Therefore, when the collector power supply of the amplifier amp2 is OFF, the image signal sig1 is supplied to the AFE and A/D converter 36 via the capacitor C1, and, when the collector power supply of the amplifier amp1 is OFF, the image signal sig2 is supplied to the AFE and A/D converter 36 via the capacitor C2. In this manner, the image signal can be switched and output without use of an analog switch. Because an ordinary MOS-type analog switch produces noises such as a thermal noise and 1/f noise and, in addition, has a large ON resistance, there arises a problem such as failure to transmit a signal accurately. Therefore, although a bipolar-type switch which is commonly called a video switch has problems such as structural complexity, high power consumption, and high cost, because the image signals are switched and output in the present embodiment without use of the analog switch, noise and cost can be reduced.

The first image sensor 12 is connected to a positive power supply VH via a switch SW1 and to a negative power supply VL via a switch SW2. The vertical driver 13 is connected to the positive power supply VH via the switch SW1 and a power supply line VH1, and to the negative power supply VL via the switch SW2 and a power supply line VL1. Meanwhile, the second image sensor 14 is connected to the positive power supply VH via a switch SW4 and to the negative power supply VL via a switch SW5. The vertical driver 15 is connected to the positive power supply VH via the switch SW4 and a power supply line VH2, and to the negative power supply VL via the switch SW5 and a power supply line VL2. The switches SW1 and SW4 are connected in series, and the power supply line of the positive power supply VH is connected to the connection point between the switches SW1 and SW4. Similarly, the switches SW2 and SW5 are connected in series, and the power supply line of the negative power supply VL is connected to the connection point between the switches SW2 and SW5. Each of these switches SW1, SW2, SW4, and SW5 is formed from a switching transistor, and the ON/OFF states of the switches are controlled by power switch control signals PSW supplied from the controller 40a. A PSW CCD1 VH signal is supplied from the controller 40a to the switch SW1, and a PSW CCD1 VL signal is supplied from the controller 40a to the switch SW2. When the switches SW1 and SW2 are both controlled to be ON, power is supplied to the first image sensor 12 and the vertical driver 13, and an image signal produced in the first image sensor 12 is output therefrom. A PSW CCD2 VH signal is supplied from the controller 40a to the switch SW4, and a PSW CCD2 VL signal is supplied from the controller 40a to the switch SW5. When the switches SW4 and SW5 are both controlled to be ON, power is supplied to the second image sensor 14 and the vertical driver 15, and an image signal produced in the second image sensor 14 is output therefrom. The controller 40a controls the operational state, non-operational state, power supply state, and power blocked state of the first image sensor 12, the vertical driver 13, the second image sensor 14, and the vertical driver 15 by supplying these control signals PSW CCD1 VH-PSW CCD2 VL to the switches. Therefore, the controller 40a also functions as the power supply control 25 shown in FIG. 5. The controller 40a supplies the control signals PSW CCD1 VH-PSW CCD2 VL to the switches according to a zoom position which is set by a user. When the zoom position is at a first zoom position, the switches SW1 and the SW2 are controlled to be ON so that the first image sensor 12 and the vertical driver 13 are supplied with power and are operational. When the zoom position is at a second zoom position, the switches SW1 and the SW2 are controlled to be OFF and the switches SW4 and SW5 are controlled to be ON so that the second image sensor 14 and the vertical driver 15 are supplied with power and are operational. The image signal sig1 or the image signal sig2 is converted into a digital image signal by the AFE and A/D converter 36 and is supplied to the controller 40a. The controller 40a stores the digital image signal in a DRAM 38 which functions as a buffer memory. The DRAM 38 is also used as a video memory; that is, VRAM, in addition to a program memory, and absorbs an asynchronous operation of the display system (LCD) and the image capturing system (CCD). The timing generator 40b and the AFE and A/D converter 36 may be provided on a single chip.

The first image sensor 12 is connected to the ground via a switch SW3, and the second image sensor 14 is connected to the ground via a switch SW6. These switches are discharge switches in order to achieve a high switching speed between image sensors by accelerating the OFF speed of the negative power supply VL of the image sensors. Specifically, the switch SW3 is controlled to be ON when the first image sensor 12 is not selected, so that the accumulated charges of the first image sensor 12 are rapidly discharged in preparation for the next time the first image sensor 12 is selected. Similarly, the switch SW6 is controlled to be ON when the second image sensor 14 is not selected, so that the accumulated charges of the second image sensor 14 are rapidly discharged in preparation for the next time the second image sensor 14 is selected. The ON/OFF states of these switches SW3 and SW6 are also controlled by the controller 40a. More specifically, the control signal PSW CCD1 VL from the controller 40a is logically inverted by an inverter and supplied to the switch SW3, and the control signal PSW CCD2 VL from the controller 40a is logically inverted by an inverter and supplied to the switch SW6. Therefore, in the first image sensor 12, when the switch SW2 is controlled to be OFF, the switch SW3 is controlled to be ON and the accumulated charges are discharged. Similarly, in the second image sensor 14, when the switch SW5 is controlled to be OFF, the switch SW6 is controlled to be ON and the accumulated charges are discharged.

Figure 12:
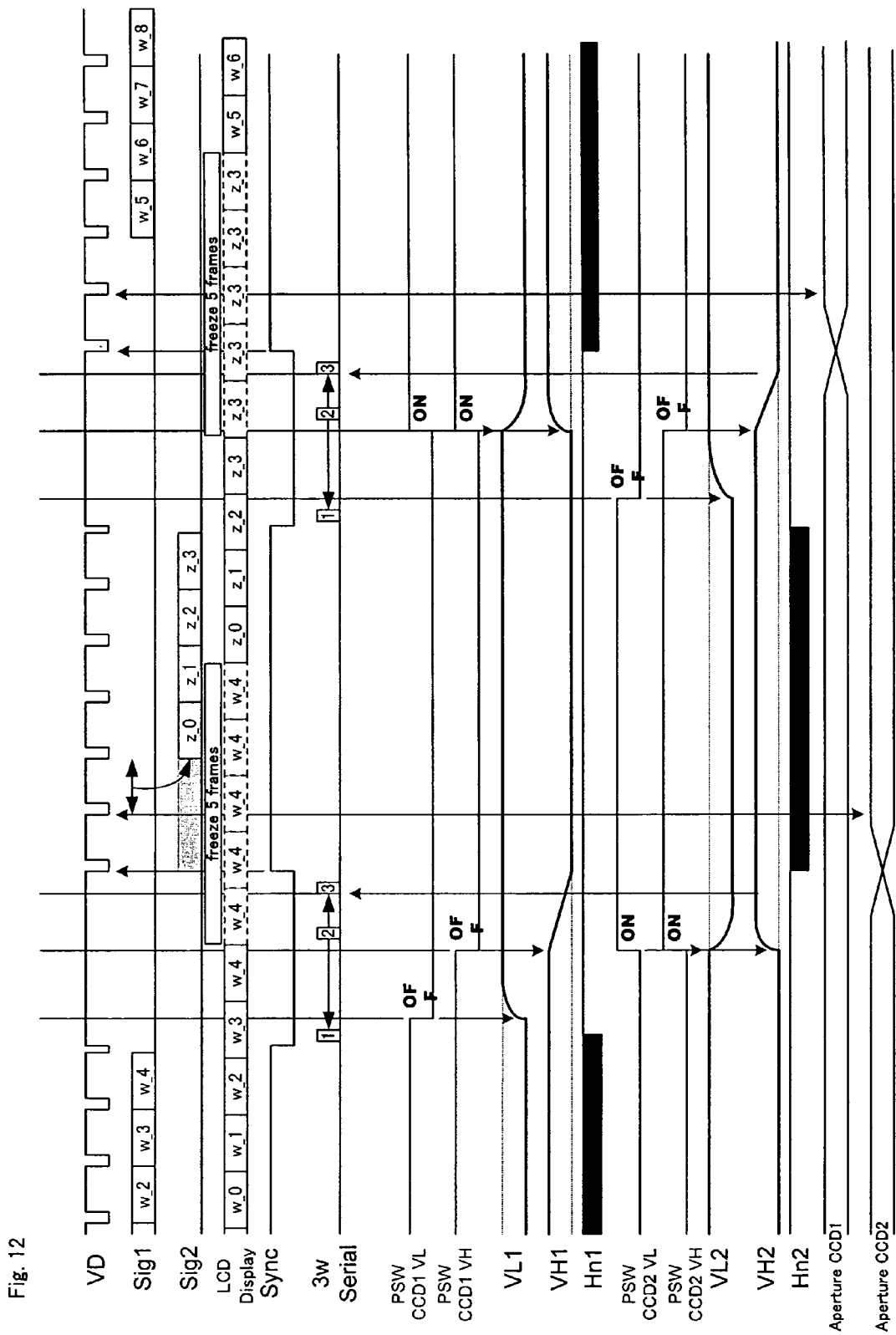
FIG. 12 is a chart showing an operation timing diagram of the digital camera shown in FIG. 11.

FIG. 12 shows an operation timing chart of a structure shown in FIG. 11, which corresponds to the switching chart of FIG. 6. When the zoom position falls within the first zoom range, the horizontal transfer drive signal Hn1 is supplied from the timing generator 40b to the first image sensor 12 and the vertical transfer drive signal Vn1 is supplied from the vertical driver 13 to the first image sensor 12. With this configuration, the image signals sig1 of images w2, w3, and w4 are sequentially output from the first image sensor 12 in synchronization with a vertical synchronization signal VD. Here, "w" (wide) is used in consideration that an image formed by the first image sensor 12 is an image formed by the fixed focal length lens 2 which is at the wide side. The images w2, w3, and w4 are sequentially displayed on the color LCD 70. When the user moves the zoom position from the wide end to the first threshold zoom position, the signal PSW CCD1 VL transitions from the ON state to the OFF state and the signal PSW CCD1 VH transitions from the ON state to the OFF state. When the signal PSW CCD1 VL is controlled to be OFF, the switch SW3 is controlled to be ON and a potential on the VL1 line is increased by a rapid discharge. Meanwhile, a potential on the VH1 line gradually decreases in response to the OFF state of the signal PSW CCD1 VH. With this process, the power supply to the first image sensor 12 and that to the vertical driver 13 are stopped. The signal PSW CCD2 VL and the signal PSW CCD2 VH transition from the OFF state to the ON state in synchronization with the timing of transition of the signal PSW CCD1 VH from the ON state to the OFF state. With this process, a potential on the VL2 line decreases and a potential on the VH2 line increases so that power is supplied to the second image sensor 14 and the vertical driver 15. When the image sensor is switched from the first image sensor 12 to the second image sensor 14, a synchronization signal Sync is forcefully set at a low level and is then forcefully switched to a High level for synchronization. In synchronization with the timing of the High level of the synchronization signal Sync, a reading process from the second image sensor 14 is started, the horizontal transfer driver signal Hn2 is supplied to the second image sensor 14, and the vertical transfer drive signal Vn2 is supplied from the vertical driver 15 to the second image sensor 14. Then, image signals sig2 of images z0, z1, and z2 are sequentially output from the second image sensor 14 in synchronization with the vertical synchronization signal VD. Here, "z" (zoom) is used in consideration that the image formed by the second image sensor 14 is an image formed by the zoom lens 3 which is at the tele side. A finite amount of time is required between the time the image w4 of the first image sensor 12 is displayed and the time the image z0 of the second image sensor 14 is displayed. Therefore, the processor 40a continues to display (freezes) the image w4 on the LCD 70 after the image w4 is displayed until the image z0 is displayed. More specifically, the processor 40a repeatedly reads the image w4 stored in the DRAM 38 and continues to display the image w4 on the LCD 70. In FIG. 12, because the LCD output of the image z0 requires a time period corresponding to 5 frames, the image w4 is frozen for 5 frames. A signal 3w serial is a 3-wire serial signal and is supplied from the controller 40a to the timing generator 40b as shown in FIG. 11. The serial signal has three state values, including "1" representing transition to a stand-by state of the CCD, "2" representing setting of the CCD (gain for CCD, electronic shutter, etc.), and "3" representing stand-by release and image signal output. When the 3w serial signal of "1" is input, the timing generator 40b transitions the first image sensor 12 to a stand-by state, and then, when the 3w serial signal of "2" is input, the timing generator 40b adjusts the gain of the second image sensor 14 on the basis of data from a light-measuring sensor. When the 3w serial signal of "3" is input after the potentials on the VH2 line and VL2 line are stabilized, the stand-by state of the first image sensor 12 is released. FIG. 12 also shows the timing chart of the apertures of the first image sensor 12 and the second image sensor 14. In FIG. 12, a crossing of lines indicates that an aperture adjustment is being executed.

FIG. 12 also shows an operation timing chart for the case where a user moves the zoom position from the tele side to the first threshold zoom position. When the user moves the zoom button from the tele side to the first zoom position, the signal PSW CCD2 VL and the signal PSW CCD2 VH are sequentially controlled from the ON state to the OFF state so that power supply to the second image sensor 14 and to the vertical driver 15 is stopped. In synchronization with the control timing of the signal PSW CCD2 VH from the ON state to the OFF state, the signal PSW CCD1 VL and the signal PSW CCD1 VH are controlled from the OFF state to the ON state so that power is supplied to the first image sensor 12 and the vertical driver 13. Then, the horizontal transfer drive signal Hn1 is supplied to the first image sensor 12 so that an image signal is read from the first image sensor 12. Because a certain amount of time is required for switching from the second image sensor 14 to the first image sensor 12, the last image z3 of the second image sensor 14 is frozen for a time period of 5 frames, and then the image w5 from the first image sensor 12 is displayed on the LCD 70.

Figure 13:
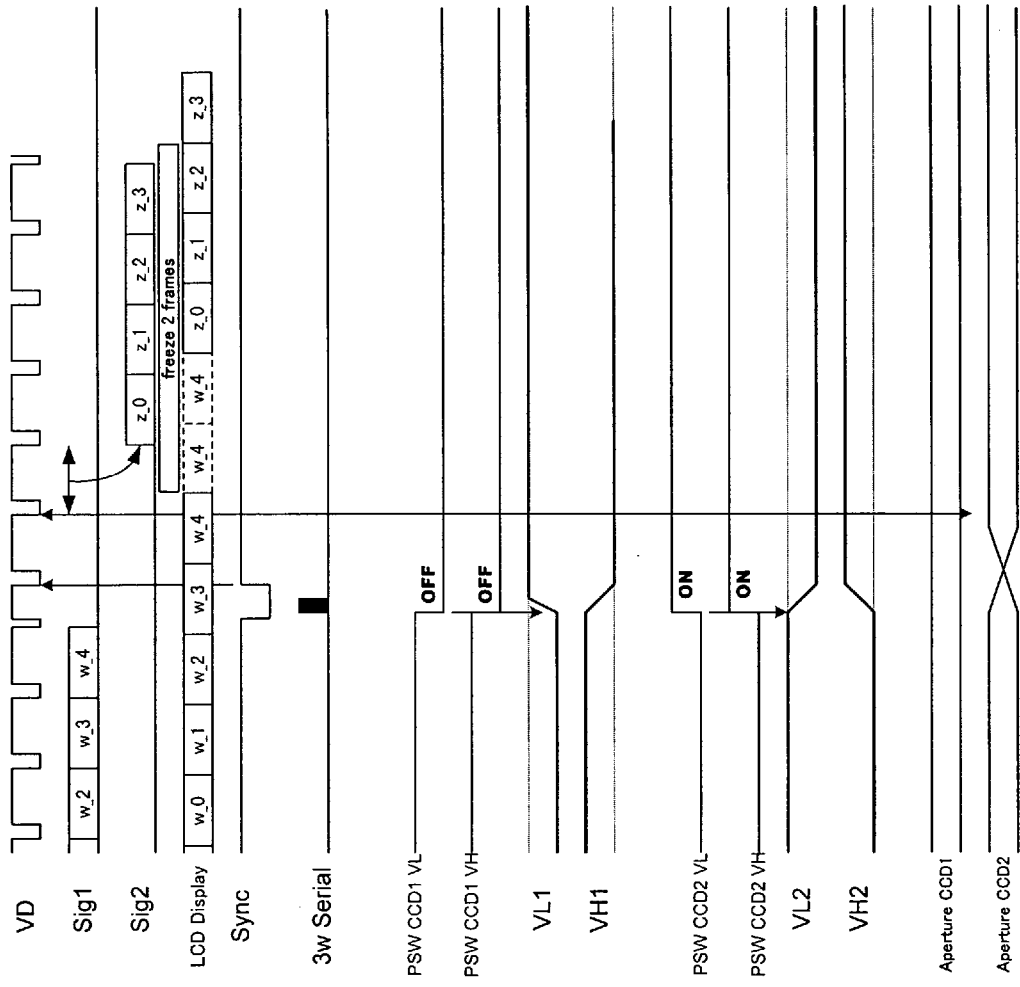
FIG. 13 is a chart showing another operation timing diagram of the digital camera shown in FIG. 11.

FIG. 13 shows another operation timing chart of the structure of FIG. 11. When the zoom position moves to the first threshold zoom position, the signal PSW CCD1 VL and the signal PSW CCD1 VH simultaneously transition from the ON state to the OFF state. In synchronization with this timing, the signal PSW CCD2 VL and the signal PSW CCD2 VH transition from the OFF state to the ON state. With the 3w serial signal, the CCD is set, a synchronization signal Sync is forcefully produced, and the image sensor is switched from the first image sensor 12 to the second image sensor 14. During the time of transition from the last image w4 of the first image sensor 12 to the first image z0 of the second image sensor 14, the last image w4 is frozen. In FIG. 12, the image w4 is frozen for a time period of two frames.

Figure 14:
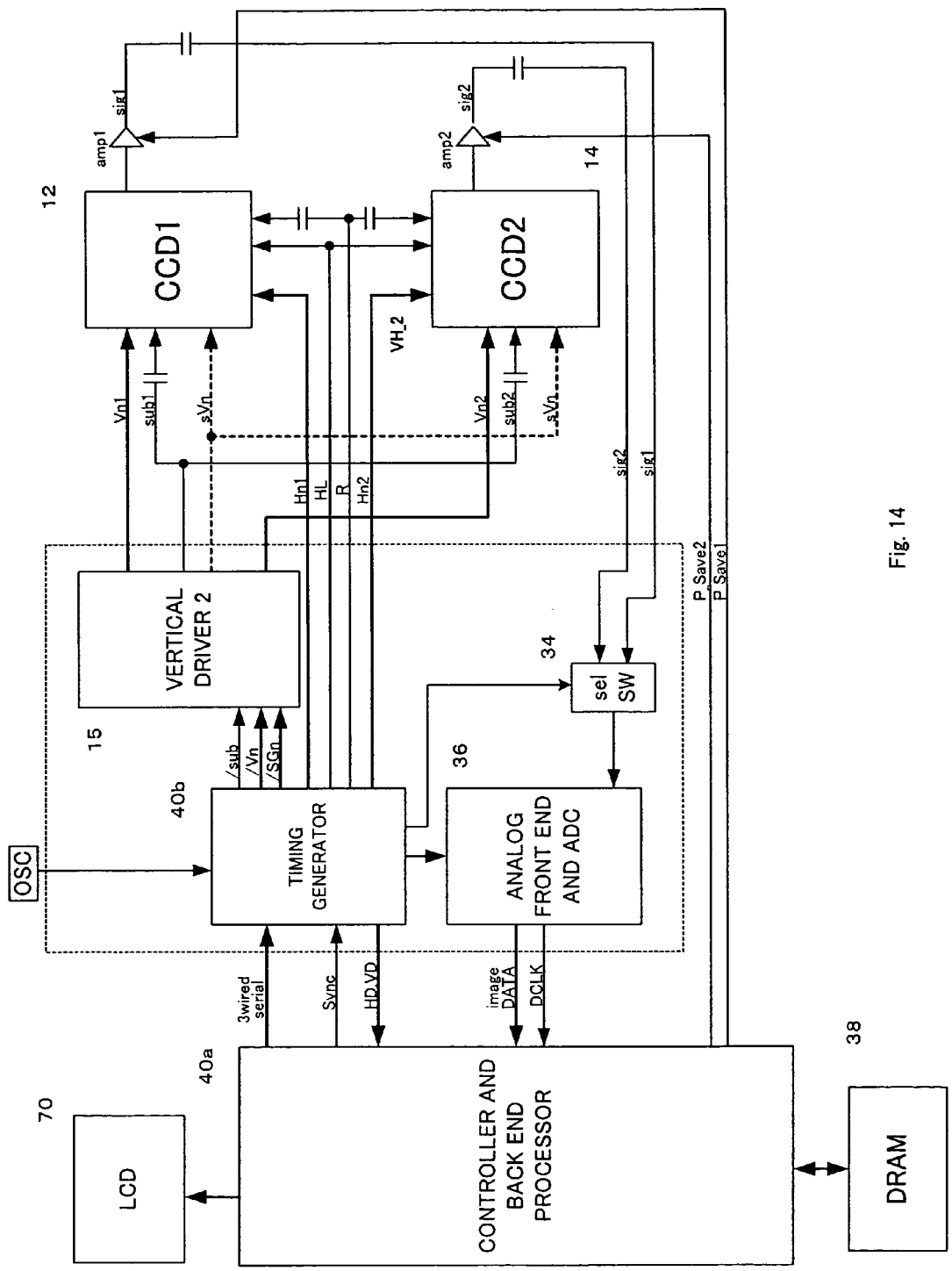
FIG. 14 is a diagram showing another detailed structure of a digital camera.

FIG. 14 shows another detailed structure of a digital camera according to the present embodiment, which corresponds to the structure of FIG. 7. Unlike the structure of FIG. 11, the vertical drivers for the first image sensor 12 and the second image sensor 14 are combined into a vertical driver 15. In addition, various switches for controlling power supply to the first image sensor 12 and the second image sensor 14 are not provided, and power itself is provided to the first image sensor 12 and the second image sensor 14 even during the non-operational state. The vertical driver 15 supplies the vertical transfer drive signal Vn1 to the first image sensor 12 and the vertical transfer drive signal Vn2 to the second image sensor 14. When the first image sensor 12 is non-operational, the supply of the vertical transfer drive signal Vn1 is stopped, and when the second image sensor 14 is non-operational, the supply of the vertical transfer drive signal Vn2 is stopped. A signal sVn is a low load drive signal and is input to a vertical transfer terminal having a small internal equivalent capacitance which is specially provided for objects such as realization of high frame rate images such as motion images through pixel addition. An image signal sig1 read from the first image sensor 12 is amplified by the amplifier amp1 and is supplied to a selector (sel) switch SW34. Similarly, an image signal sig2 read from the second image sensor 14 is amplified by the amplifier amp2 and is supplied to the selector switch SW34. The selector switch SW34 is an equivalent switch which is formed by making a sampling capacitor of a correlated double sampling circuit into a switching type or the like and functions as the MUX 34 of FIG. 7. The selector switch SW34 selects and outputs one of the signals sig1 and sig2 in accordance with a signal from the timing generator 40b. Specifically, the controller 40a supplies a switching signal to the timing generator 40b as a 3 wired serial signal, and the timing generator 40b controls switching of the selector switch SW34 in accordance with the switching signal. The image signal output from the selector switch 34 is supplied to the controller 40a. The amplifiers amp1 and amp2 are emitter followers having bipolar transistors. When the amplifiers amp1 and amp2 are not used, the emitter current is stopped by a P save1 signal and P save2 signal from the controller 40a.

Figure 15:
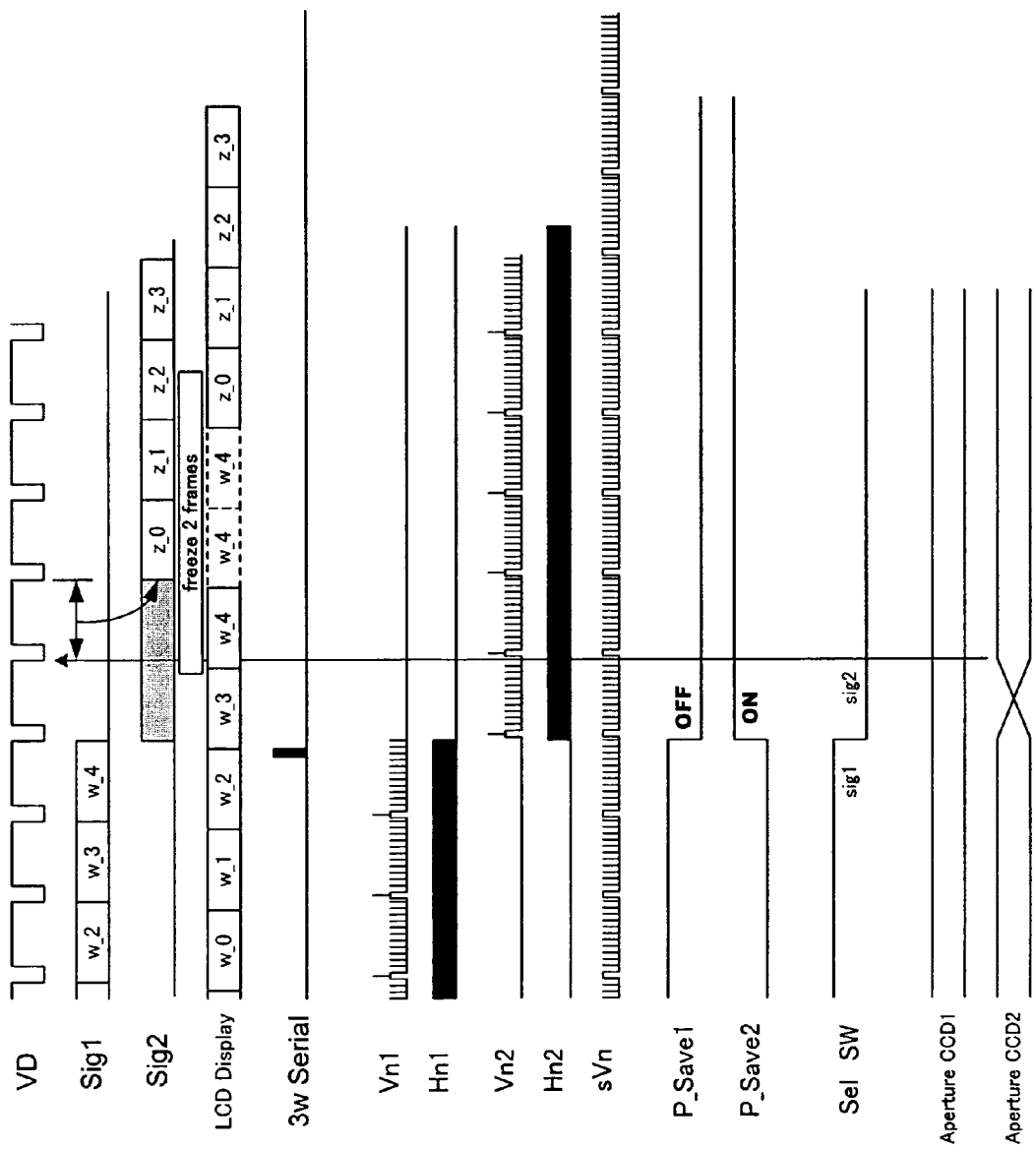
FIG. 15 is a chart showing an operation timing diagram of the digital camera shown in FIG. 14.

FIG. 15 shows an operation timing chart for the structure of FIG. 14. FIG. 15 corresponds to the switching chart of FIG. 9. When the zoom position falls within the first zoom range, the image signal sig1 is output from the first image sensor 12 in response to the horizontal transfer drive signal Hn1 and the vertical transfer drive signal Vn1, the signal sig1 is selected at the selector switch SW3, and images w0, w2, w3, . . . are sequentially output. In this process, the horizontal transfer drive signal Hn2 and the vertical transfer drive signal Vn2 are not output to the second image sensor 14. When the zoom position moves to the first threshold zoom position, the 3w serial signal is supplied from the processor 40a to the timing generator 40b. In response to this signal, supply of the horizontal transfer drive signal Hn1 and the vertical transfer drive signal Vn1 to the first image sensor 12 is stopped, and the horizontal transfer drive signal Hn2 and the vertical drive signal Vn2 are output to the second image sensor 14. The controller 40a switches between and outputs the P save1 signal and the P save2 signal. With this process, the emitter current of the amplifier amp1 is stopped and the emitter current of the amplifier amp2 flows. In addition, in response to a signal from the timing generator 40b, the selector switch SW34 switches the output to be selected from the signal sig1 to the signal sig2. In other words, the gain of the second image sensor 14, adjustment of the electronic shutter of the second image sensor 14, switching of the horizontal driver signal Hn, switching of the vertical drive signal Vn, and switching at the selector switch SW34 are controlled by the 3w serial signal from the processor 40a. Because a certain amount of time is required for switching from the first image sensor 12 to the second image sensor 14, the processor 40a freezes the last image w4 of the first image sensor 12 for a predetermined number of frames (in FIG. 15, 2 frames) and displays the image w4 on the LCD 70.

Figure 16:
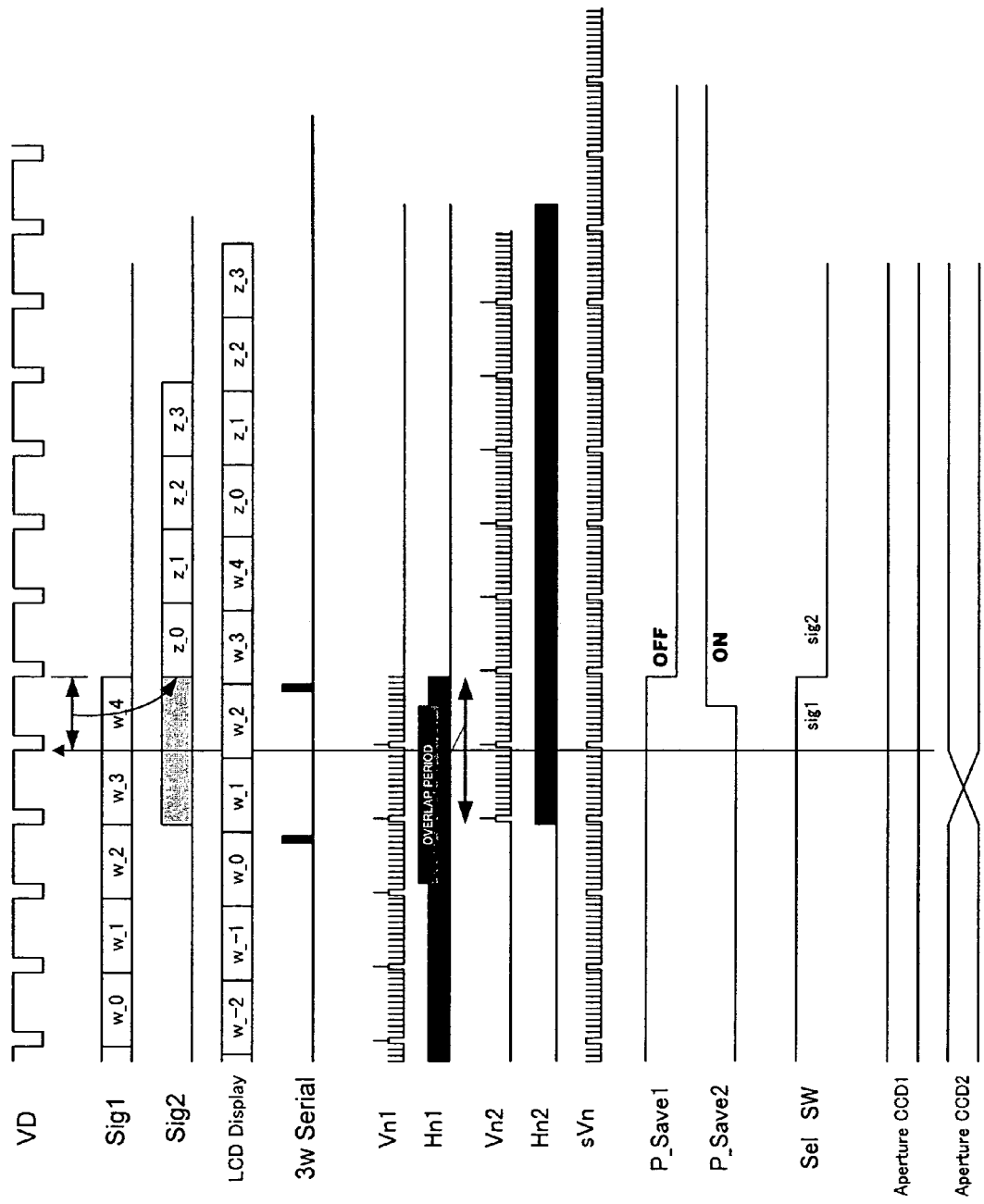
FIG. 16 is a chart showing another operation timing diagram of the digital camera shown in FIG. 14.

FIG. 16 shows another operation timing chart for the structure of FIG. 14, which corresponds to the switching chart of FIG. 10. When the zoom position is at the first zoom position, the horizontal transfer drive signal Hn1 and the vertical transfer drive signal Vn1 are supplied to the first image sensor 12, but the horizontal transfer drive signal Hn2 and the vertical transfer drive signal Vn2 are not supplied to the second image sensor 14. When the zoom position moves to the second threshold zoom position, which is at a position nearer to the wide side than is the first threshold zoom position, the processor 40a supplies the 3w serial signal to the timing generator 40b. In response to this signal, the timing generator 40b supplies the horizontal transfer drive signal Hn2 and the vertical transfer drive signal Vn2 to the second image sensor 14 at the second threshold zoom position. Therefore, a period from the first threshold zoom position to the second threshold zoom position forms an overlap period in which the first image sensor 12 and the second image sensor 14 both operate. At this zoom position, the selector switch SW34 continues to select and output the signal sig1, and, therefore, the signal sig2 from the second image sensor 14 is not output. When the zoom position reaches the first threshold zoom position, the processor 40a again supplies the 3w serial signal to the timing generator 40b. In response to this signal, the timing generator 40b stops supply of the horizontal transfer drive signal Hn1 and the vertical transfer drive signal Vn1 to the first image sensor 12 and switches the selection and output of the selector switch SW34 from the signal sig1 to the signal sig2. With this process, the signal sig2 from the second image sensor 14 is supplied to the processor 40a and is displayed on the LCD 70. Because operation of the second image sensor 14 is started at the second threshold zoom position, which is immediately before the first threshold zoom position, the image z0 from the second image sensor 14 is already produced at the first threshold zoom position. Therefore, there is no need to freeze the last image w4 of the first image sensor 12. In other words, the display of the LCD 70 becomes continuous without a discrepancy.

In the above-described embodiment, the first image sensor 12 and the second image sensor 14 are selectively operated in order to reduce power consumption. In addition, power consumption can be reduced by a certain amount even in a configuration in which the first image sensor 12 and the second image sensor 14 are both operated, by sharing the vertical driver 15 or the like. By operating both the first image sensor 12 and the second image sensor 14, images of the same target that differ in angle of view can be obtained and can be synthesized to obtain an image which cannot be obtained by a single image capturing optical system.

A configuration in which a synthesized image is obtained by operating both the first image sensor 12 and the second image sensor 14 will now be described.

Figure 17:
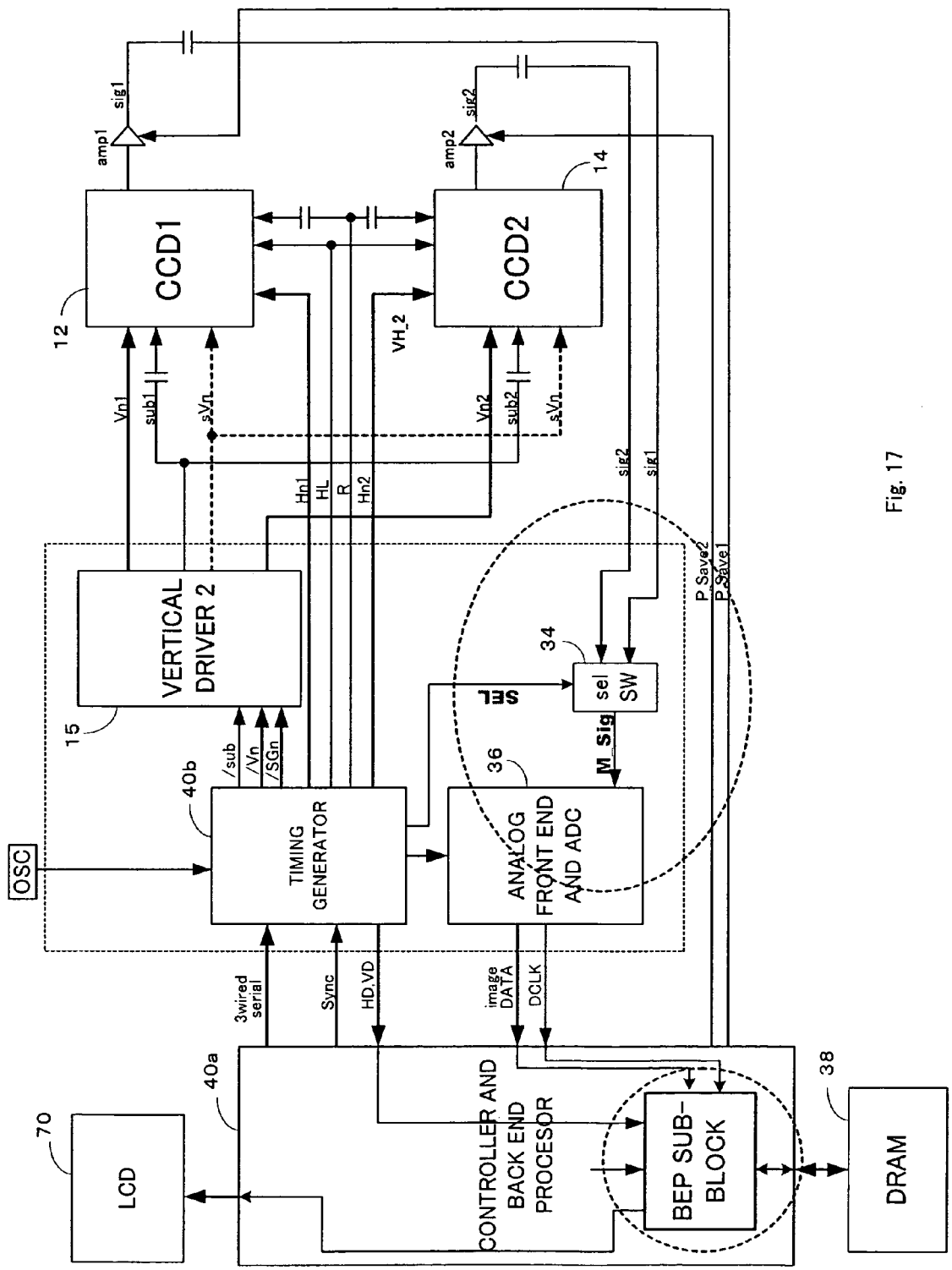
FIG. 17 is a diagram showing another detailed structure of a digital camera in which two CCDs are simultaneously driven.

FIG. 17 shows a detailed structure for a case where both the first image sensor 12 and the second image sensor 14 are operated. The structure is nearly identical with the structure of FIG. 14, except that a common vertical driver 15 supplies the vertical transfer drive signals Vn1 and Vn2 to the first image sensor 12 and the second image sensor 14 to simultaneously drive the first image sensor 12 and the second image sensor 14. Similar to the case of the configuration shown in FIG. 4, during a period other than the timing at which two images are synthesized, one of the signals Vn1 and Vn2 is selectively supplied. An output of the first image sensor 12 is amplified by the amplifier amp1 and supplied to the selector switch SW34. An output of the second image sensor 14 is amplified by the amplifier amp2 and supplied to the selector switch SW34. In response to the 3 wired serial signal from a controller and back end processor 40a, the timing generator 40b supplies a selection signal SEL to the selector switch SW34 to control the selection process. The selector switch SW34 outputs a signal in which the signals sig1 and sig2 are multiplexed by alternately switching and outputting the signal sig1 from the first image sensor 12 and the signal sig2 from the second image sensor 14 in accordance with the selection signal SEL. The selection includes a number of forms or levels. Specifically, the selection is executed in the following three levels: (1) units of frames, (2) units of lines, and (3) units of pixels. The selector switch SW34 supplies the multiplexed signal to the AFE 36, and the AFE 36 supplies the multiplexed signal to the back end processor (BEP) sub-block of the controller and back end processor 40a. The BEP sub-block processes the multiplexed signal to produce and output a synthesized image in which two images are synthesized at a desired size.

Figure 18:
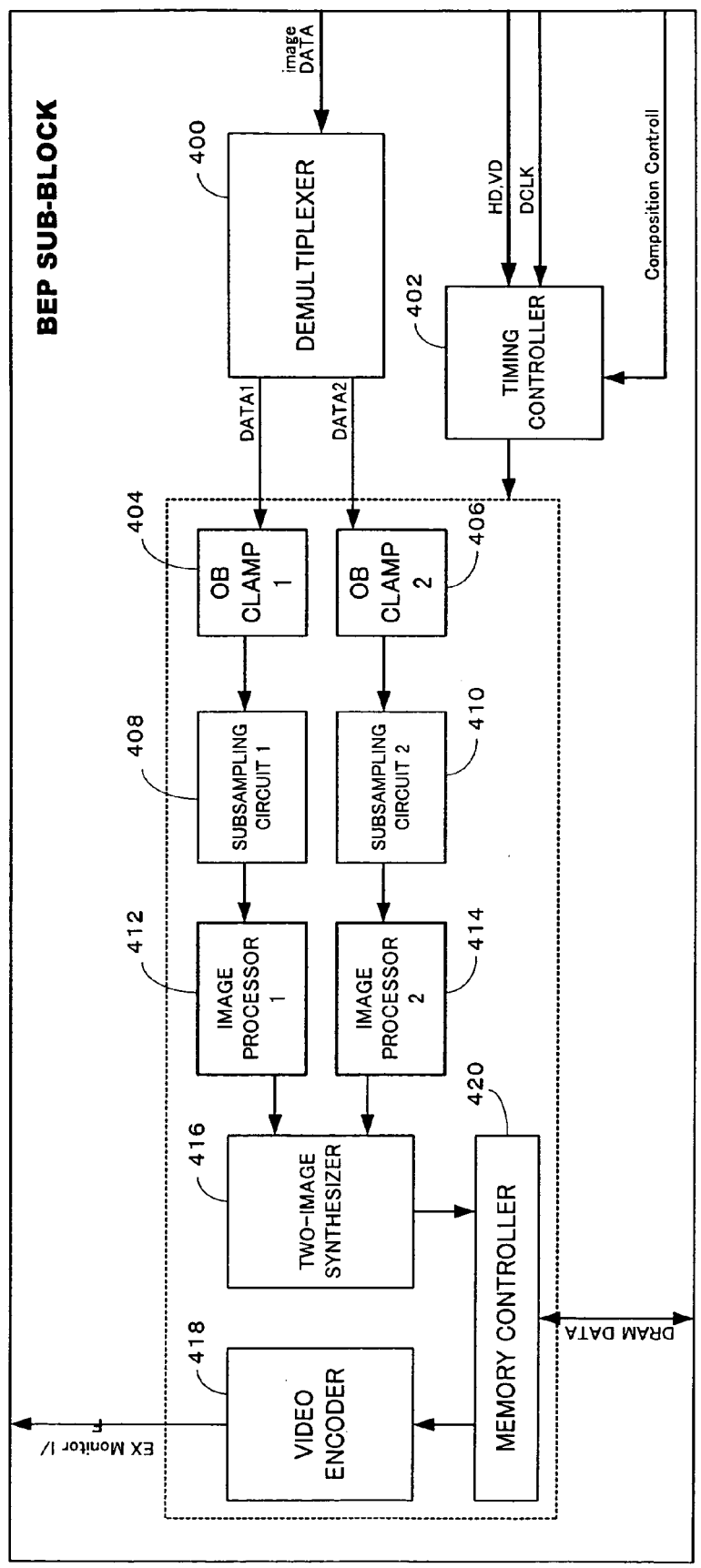
FIG. 18 is a diagram showing a structure of a BEP sub-block shown in FIG. 17.

FIG. 18 shows a structure of the BEP sub-block of FIG. 17. A demultiplexer 400 separates the multiplexed signal into the original signals sig1 and sig2 and supplies the signal sig1 as digital data DATA1 to an OB clamp circuit 404 and the signal sig2 as digital data DATA2 to an OB clamp circuit 406. The OB clamp circuits 404 and 406 clamp the black level (optical black) and supply the clamped signals to subsampling circuits 408 and 410. The subsampling circuits 408 and 410 enlarge or reduce the image by sampling and supply the enlarged or reduced image to image processors 412 and 414. The image processors 412 and 414 perform image processes such as interpolation, white balance, color matrix, and coring and supply the processed image to a two-image synthesizer 416. The two-image synthesizer 416 synthesizes two input images and writes the synthesized image to the DRAM 38 via a memory controller 420. A VRAM is placed on the space of the DRAM 38 and the memory controller 420 asynchronously executes a reading process from a video encoder 418 and a writing process from the two-image synthesizer 416. The video encoder 418 converts the synthesized image read from the DRAM 38 into a typical video format such as NTSC composite and outputs the converted image to the LCD 70 or the like. A timing controller 402 controls timings of elements of the sub-block.

Figure 19:
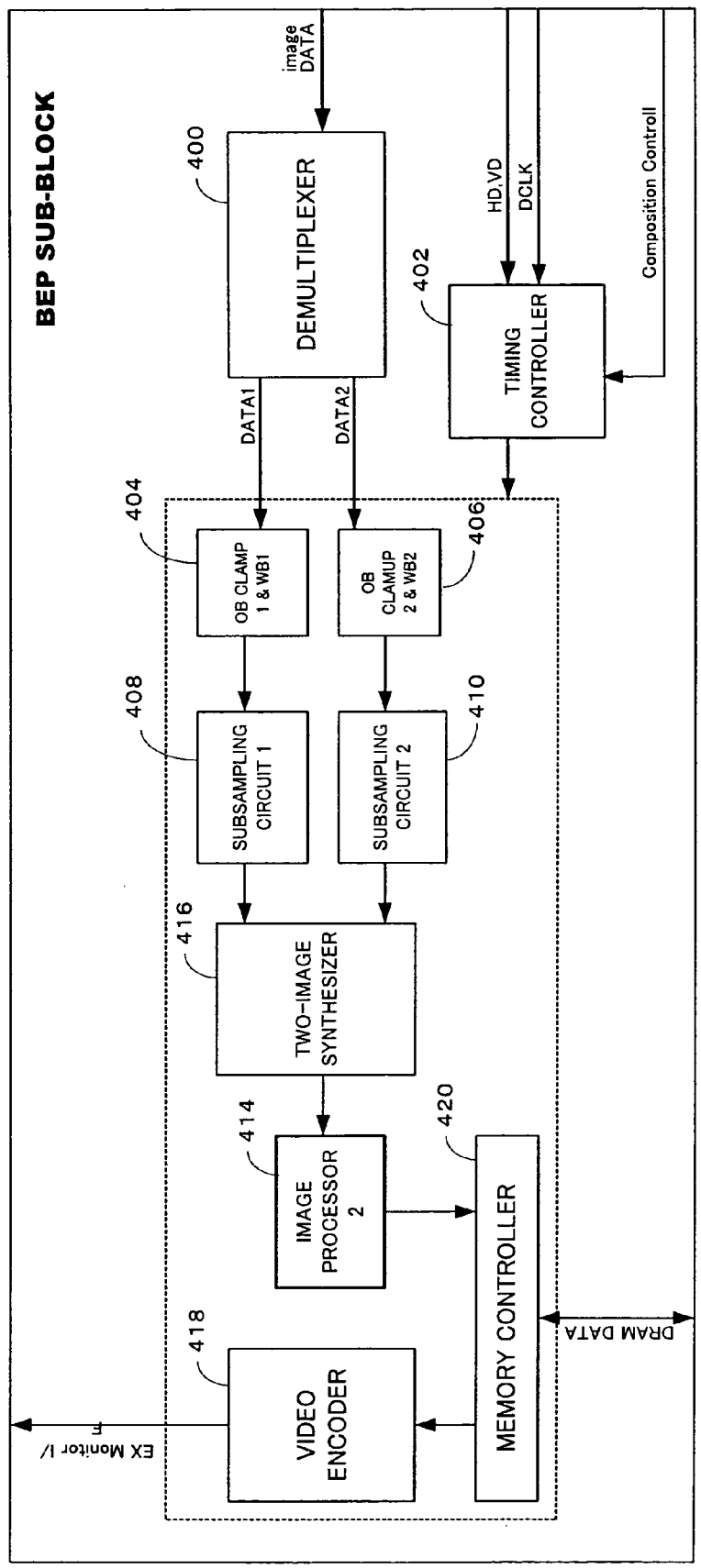
FIG. 19 is a diagram showing another structure of a BEP sub-block shown in FIG. 17.

In the configuration of FIG. 18, the image processors 412 and 414 are separately provided in correspondence to the images, but, as shown in FIG. 19, the image processor 414 may be shared. In this case, the two-image synthesizer 416 is provided downstream of the subsampling circuits 408 and 410 and supplies the synthesized image to the image processor 414. The image processor 414 performs predetermined image processes on the synthesized image and writes the processed image into the DRAM 38.

Figure 20:
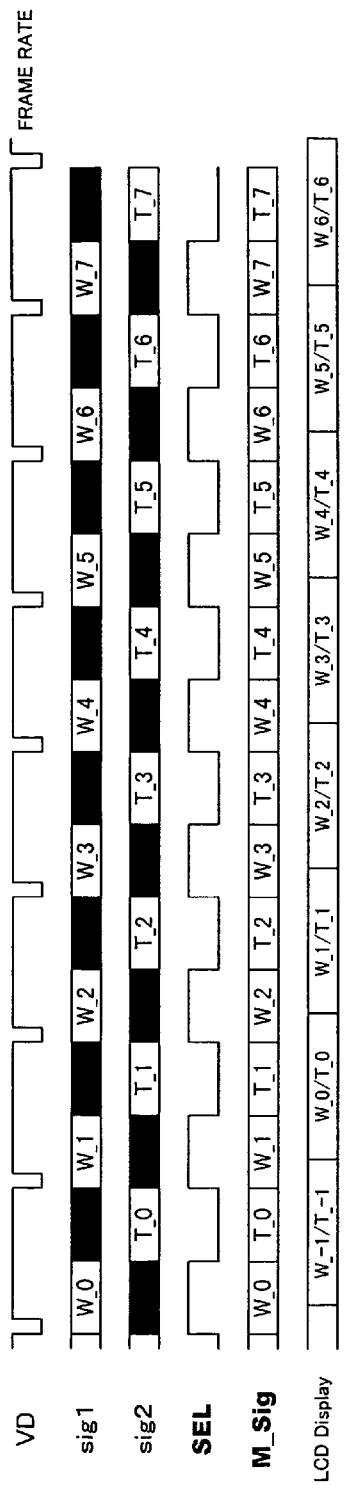
FIG. 20 is a timing chart for a case where multiplexing is performed in units of frames.
Figure 21:
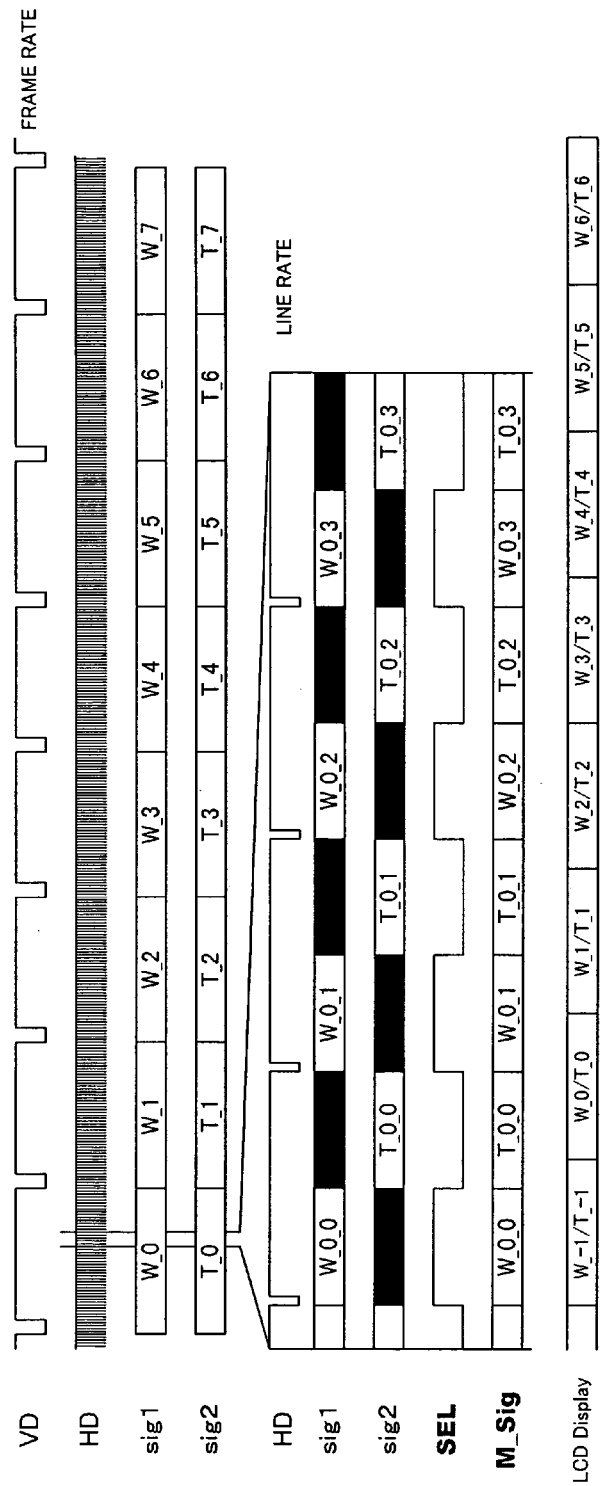
FIG. 21 is a timing chart for a case where multiplexing is performed in units of lines.
Figure 22:
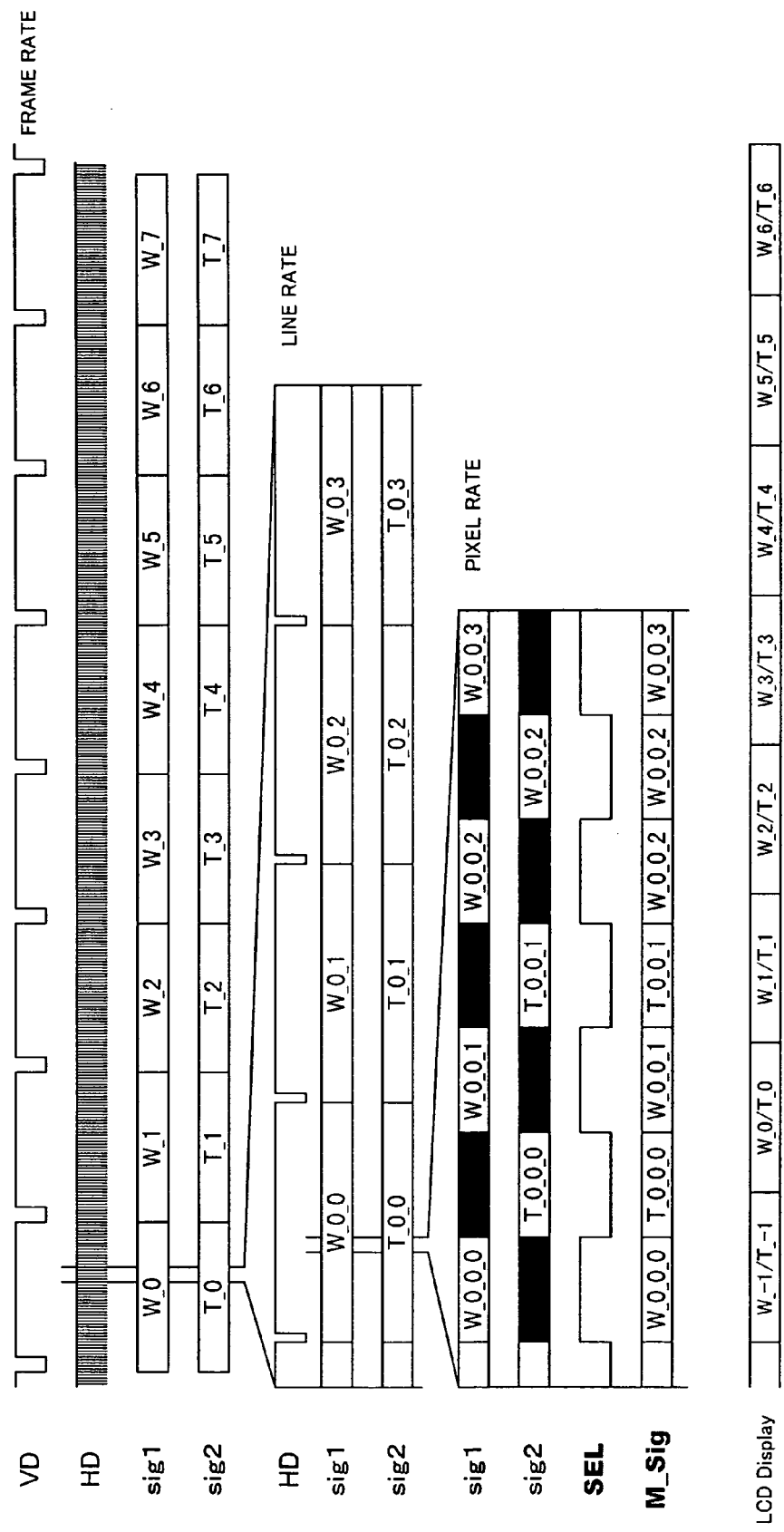
FIG. 22 is a timing chart for a case where multiplexing is performed in units of pixels.

FIGS. 20, 21, and 22 show timing charts where the images are multiplexed in units of frames, in units of lines, and in units of pixels, respectively. FIG. 20 shows a configuration in which the images are multiplexed in units of frames. A selection signal SEL selects the signal sig1 in a first half period in synchronization with the vertical synchronization signal VD and selects the signal sig2 in a second half period. With this configuration, a signal M sig from the selector switch SW34 becomes a signal in which an image W from the first image sensor 12 is multiplexed in the first half of a frame and an image T from the second image sensor 14 is multiplexed in the second half of a frame. FIG. 21 shows a configuration in which the images are multiplexed in units of lines. The selection signal SEL selects the signal sig1 in a first half period in synchronization with a horizontal synchronization signal HD and selects the signal sig2 in a second half period. With this configuration, the signal M sig from the selector switch SW34 becomes a signal in which the image W from the first image sensor 12 is multiplexed in the first half of one line and the image T from the second image sensor 14 is multiplexed in the second half of one line. FIG. 22 shows a configuration in which the images are multiplexed in units of pixels. The selection signal SEL alternately selects the signals sig1 and sig2 in synchronization with a pixel rate of each line. With this configuration, the signal M sig from the selector switch SW34 becomes a signal in which the image W from the first image sensor 12 and the image T from the second image sensor 14 are multiplexed alternately, on a pixel by pixel basis.

Figure 25A:
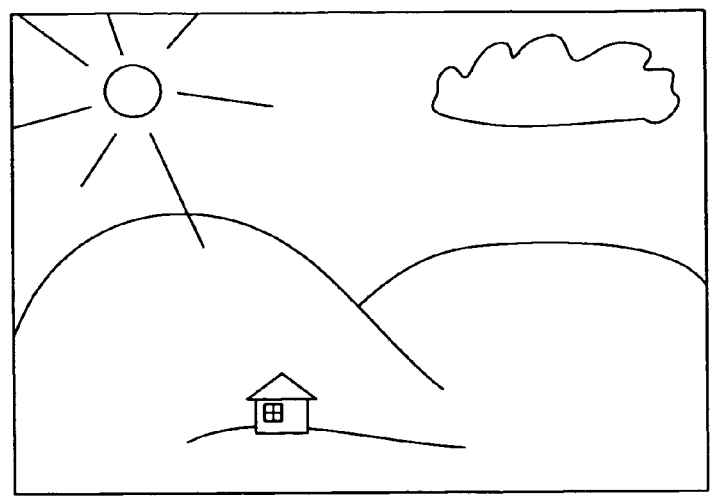
FIG. 25A is a diagram for explaining a synthesized image.
Figure 25B:
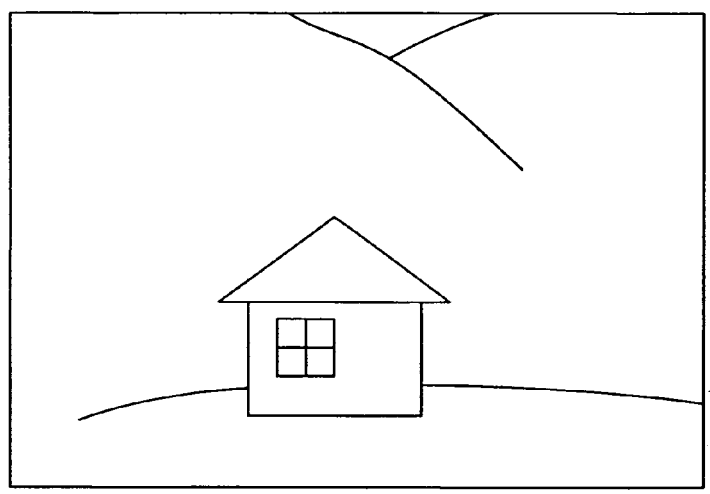
FIG. 25B is a diagram for explaining a synthesized image.
Figure 25C:
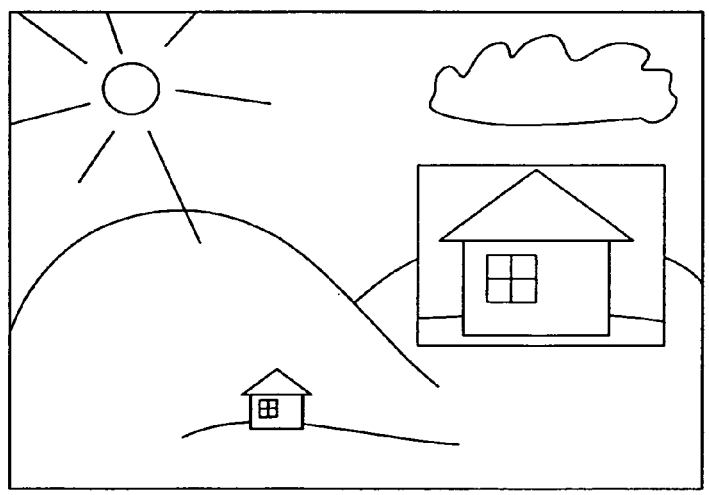
FIG. 25C is a diagram for explaining a synthesized image.

FIGS. 25A, 25B, and 25C show synthesis of the image from the first image sensor 12 and the image from the second image sensor 14 as described above. FIG. 25A shows an image obtained by the first image sensor 12, which is an image having a wide angle of view. FIG. 25B shows an image obtained by the second image sensor 14, which is an image with a tele angle of view in which a portion of a wide angle of view is zoomed. FIG. 25C shows a synthesized image in which the image of FIG. 25B is reduced and a portion of the reduced image is cut and synthesized into the image of FIG. 25A. The user can obtain an image unique to a digital camera having two image capturing optical systems by viewing such a synthesized image displayed on the LCD 70.

In the structure of FIG. 17, the signal M sig multiplexed in the selector switch SW34 is supplied to a single AFE 36. Alternatively, two AFEs may be provided in place of the selector switch SW34.

Figure 23:
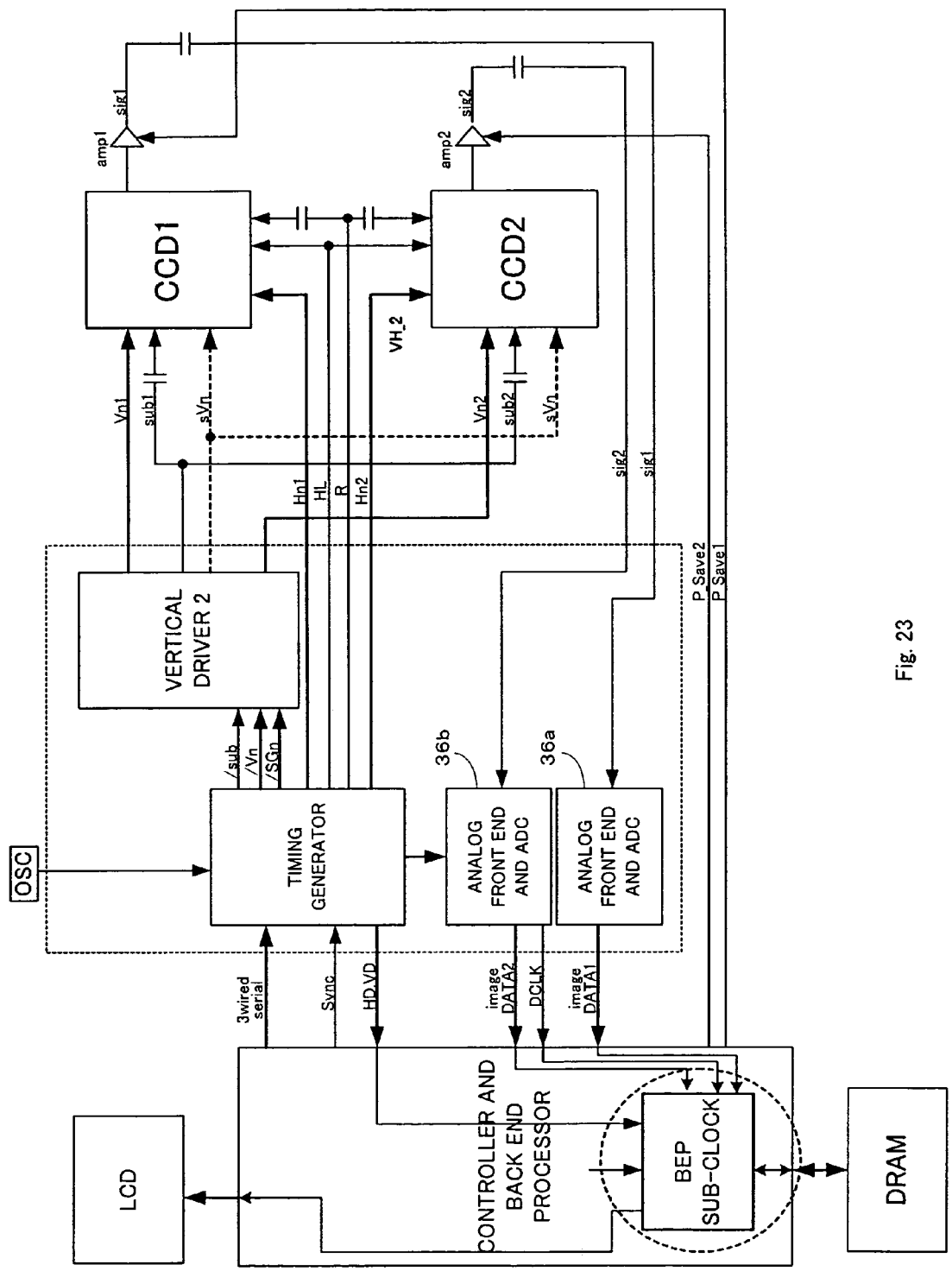
FIG. 23 is a diagram showing another detailed structure of a digital camera in which two CCDs are simultaneously driven.

FIG. 23 shows a configuration when two AFEs 36a and 36b are used. A signal from the first image sensor 12 is amplified by the amplifier amp1 and supplied to the AFE 36a, and a signal from the second image sensor 14 is amplified by the amplifier amp2 and supplied to the AFE 36b. The AFEs 36a and 36b convert the signals sig1 and sig2 into digital data DATA1 and digital data DATA2 and supply the digital data DATA1 and digital data DATA2 to the BEP sub-block.

Figure 24:
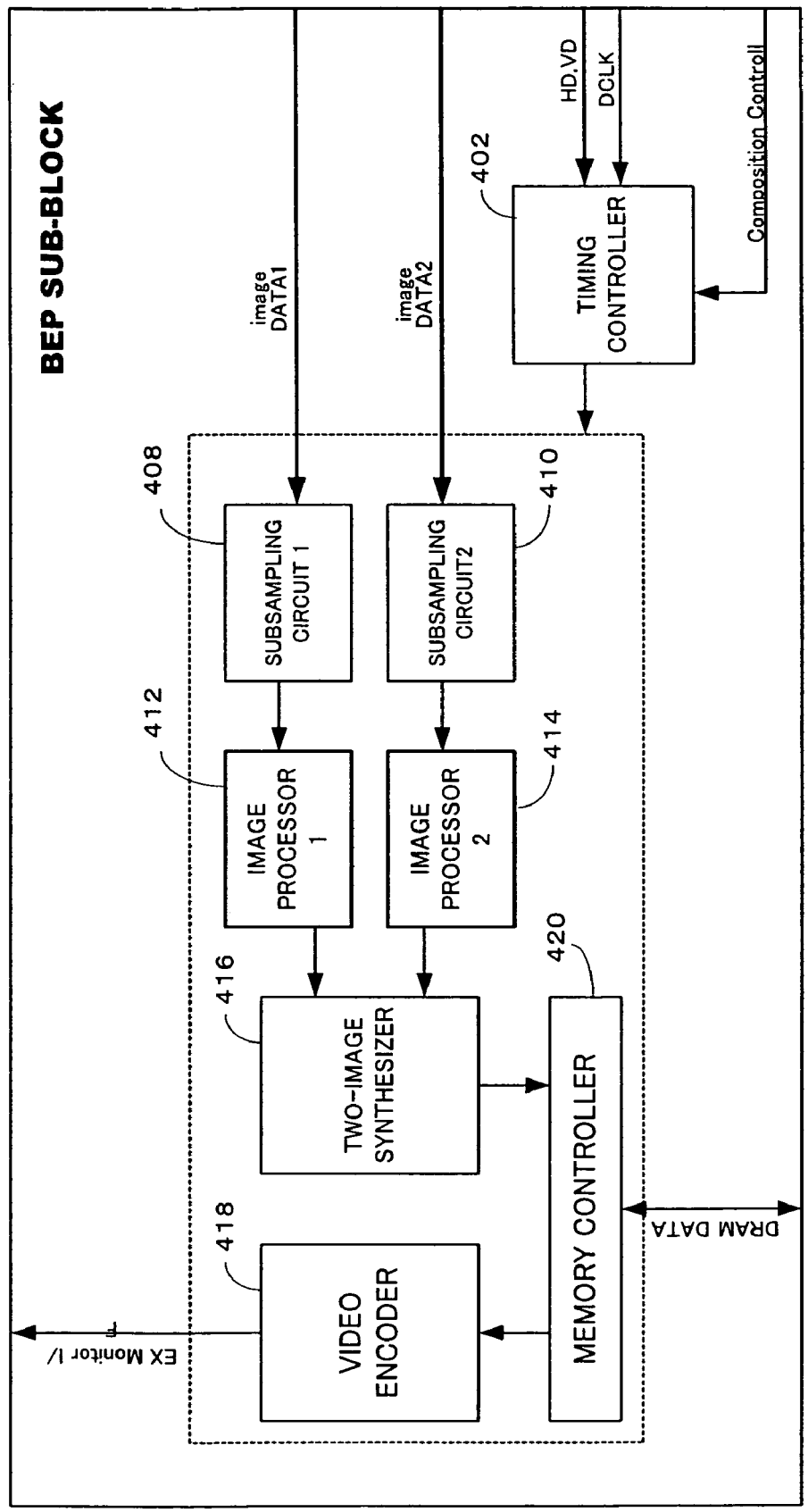
FIG. 24 is a diagram showing a structure of a BEP sub-block shown in FIG. 23.

FIG. 24 shows a structure of the BEP sub-block in FIG. 23. Unlike the configuration shown in FIG. 18, because the images are pre-processed by the AFEs 36a and 36b, the demultiplexer 400 and OB clamp circuits 404 and 406 are unnecessary, and, thus, the structure can be simplified.

What is claimed is:

1. An image capturing device having multiple optical systems, comprising:
    a first image capturing optical system which has a first lens and a first image capturing element with a relatively wide angle of view and which has a variable angle of view;
    a second image capturing optical system which has a second lens and a second image capturing element with a relatively narrow angle of view and which has a variable angle of view;
    a user operating unit which sets a zoom position; and
    a control unit which outputs one of an image signal from the first image capturing optical system and an image signal from the second image capturing optical system in accordance with the zoom position which is set by the user operating unit, the control unit performing control to output the image signal from the first image capturing optical system while controlling the second image capturing element to a non-operational state when the zoom position falls within a first zoom range which is at a wider angle than is a predetermined first threshold zoom position and the control unit performing control to output the image signal from the second image capturing optical system while controlling the first image capturing element to a non-operational state when the zoom position falls within a second zoom range which is positioned nearer to a tele side than is the first threshold zoom position; wherein the control unit comprises:

a first amplifying unit which is connected to the first image capturing element and which amplifies and outputs the image signal from the first image capturing optical system; and a second amplifying unit which is connected to the second image capturing element and which amplifies and outputs the image signal from the second image capturing optical system, wherein the first amplifying unit and the second amplifying unit have a characteristic that an output terminal attains high impedance when supply of power is stopped and are connected in parallel to each other; and the image capturing device further comprises a unit which selectively connects the power supply of the first amplifying unit or the second amplifying unit in accordance with the zoom position which is set by the user operating unit.

2. An image capturing device having multiple optical systems according to claim 1, further comprising:

a first clock driver which supplies an operation clock signal to the first image capturing element; and a second clock driver which supplies an operation clock signal to the second image capturing element; wherein the control unit comprises a power supply unit which supplies power to the first image capturing element, the first clock driver, the second image capturing element and the second clock driver, wherein the power supply unit supplies power to the first image capturing element and the first clock driver while stopping supply of power to the second image capturing element and the second clock driver when the zoom position falls within the first zoom range and the power supply unit supplies power to the second image capturing element and the second clock driver while stopping supply of power to the first image capturing element and the first clock driver when the zoom position falls within the second zoom range.

3. An image capturing device having multiple optical systems according to claim 2, wherein the power supply unit comprises:

a positive power supply;

a negative power supply;

a first switching unit which selectively supplies the positive power supply and the negative power supply to the first image capturing element and the first clock driver; and a second switching unit which selectively supplies the positive power supply and the negative power supply to the second image capturing element and the second clock driver, wherein the control unit controls the first switching unit to be ON while controlling the second switching unit to be OFF when the zoom position falls within the first zoom range and controls the first switching unit to be OFF while controlling the second switching unit to be ON when the zoom position falls within the second zoom range.

4. An image capturing device having multiple optical systems according to claim 3, further comprising:

a third switching unit which selectively grounds a power supply line of the first image capturing element; and a fourth switching unit which selectively grounds a power supply line of the second image capturing element, wherein the control unit controls the second switching unit to be OFF and the fourth switching unit to be ON in order to discharge charges accumulated in the second image capturing element and controls the first switching unit to be OFF and the third switching unit to be ON in order to discharge charges accumulated in the first image capturing element.

5. An image capturing device having multiple optical systems according to claim 1, further comprising:

a common clock driver which supplies an operation clock signal to the first image capturing element and the second image capturing element, wherein the control unit controls the common clock driver in accordance with the zoom position so that the common clock driver supplies the operation clock signal to the first image capturing element while stopping supply of the operation clock signal to the second image capturing element when the zoom position falls within the first zoom range and the common clock driver supplies the operation clock signal to the second image capturing element while stopping supply of the operation clock signal to the first image capturing element when the zoom position falls within the second zoom range.

6. An image capturing device having multiple optical systems according to claim 5, wherein the common clock driver supplies a common signal as a low-load drive signal with respect to the first image capturing element and as a low-load drive signal with respect to the second image capturing element.

7. An image capturing device having multiple optical systems according to claim 1, further comprising:

a first amplifying unit which is connected to the first image capturing element and which comprises an emitter follower bipolar transistor which amplifies and outputs the image signal from the first image capturing optical system;

a second amplifying unit which is connected to the second image capturing element and which comprises an emitter follower bipolar transistor which amplifies and outputs the image signal from the second image capturing optical system;

a selecting unit to which a signal from the first amplifying unit and a signal from the second amplifying unit are input and which selectively outputs one of the signal from the first amplifying unit and the signal from the second amplifying unit, and a unit which stops an emitter current of the amplifying unit which is not selected by the selecting unit.

8. An image capturing device having multiple optical system according to claim 1, wherein each of the first amplifying unit and the second amplifying unit is an emitter follower which uses a bipolar transistor.

* * * * *